(12) United States Patent
Le Leannec et al.

(10) Patent No.: US 7,281,033 B2
(45) Date of Patent: Oct. 9, 2007

(54) METHOD AND DEVICE FOR FORMING A REDUCED COMPRESSED DIGITAL SIGNAL

(75) Inventors: Fabrice Le Leannec, Cesson Sevigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 857 days.

(21) Appl. No.: 10/352,971

(22) Filed: Jan. 29, 2003

(65) Prior Publication Data

US 2003/0174897 A1   Sep. 18, 2003

(30) Foreign Application Priority Data

Jan. 29, 2002   (FR)  .................................. 02 01030

(51) Int. Cl.
*G06F 15/13*   (2006.01)
(52) U.S. Cl. ...................... 709/217; 709/231; 709/236; 370/352
(58) Field of Classification Search ................ 709/217, 709/231, 236; 370/352
See application file for complete search history.

(56) References Cited

U.S. PATENT DOCUMENTS

| | | | | |
|---|---|---|---|---|
| 6,032,197 | A  * | 2/2000 | Birdwell et al. ............. | 709/247 |
| 6,304,914 | B1 | 10/2001 | Deo et al. ................... | 709/247 |
| 6,314,095 | B1 * | 11/2001 | Loa ............................ | 370/352 |
| 6,397,259 | B1 * | 5/2002 | Lincke et al. ............... | 709/236 |
| 6,501,860 | B1 | 12/2002 | Charrier et al. ............. | 382/240 |
| 6,654,809 | B1 * | 11/2003 | Hulme et al. ................ | 709/231 |
| 6,988,131 | B2 * | 1/2006 | Kitamura .................... | 709/217 |
| 2002/0048319 | A1 | 4/2002 | Onno ......................... | 375/240 |
| 2002/0051583 | A1 | 5/2002 | Brown et al. ................ | 382/299 |
| 2002/0191852 | A1 | 12/2002 | Le Leannec et al. ........ | 382/233 |

OTHER PUBLICATIONS

Dugad, et al., "A Fast Scheme For Image Size Change In The Compressed Domain", IEEE Transactions on Circuits and Systems for Video Technology, vol. 11, No. 4, pp. 461-474, Apr. 2001.

(Continued)

*Primary Examiner*—Jinsong Hu
(74) *Attorney, Agent, or Firm*—Fitzpatrick, Cella, Harper & Scinto

(57) ABSTRACT

A method of forming a reduced compressed digital signal, in which the reduced compressed digital signal is formed from an initial compressed digital signal with several hierarchical levels which has been obtained by the compression, according to a hierarchical compression format, of a digital signal comprising data representing physical quantities. The initial signal thus compressed includes at least one header which includes information representing the configuration of the signal and the structure of the data therein, the configuration of the signal being defined by an initial set of parameters characterizing all the hierarchical levels of the signal. The method includes forming, from the at least one header of the initial compressed signal, at least one header of the reduced compressed signal which includes information representing a reduced configuration of the initial signal and the structure of the data in the compressed signal of reduced configuration, the reduced configuration being defined by a final set of parameters characterizing at least one of the hierarchical levels of the initial compressed signal. The compressed data is extracted corresponding to the final set of parameters from the initial compressed signal, and this data is inserted into the reduced compressed signal being formed.

38 Claims, 11 Drawing Sheets

OTHER PUBLICATIONS

Deshpande, et al., "HTTP Streaming of JPEG 2000 Images", Proceedings International Conference on Information Technology: Coding and Computing, XX, XX, pp. 15-19, Apr. 2, 2001.

Chee-Hung Henry Chu: "Data Compression by Multiresolution Tree Search," Optical Engineering, Soc. Of Photo-Optical Instrumentation Engineers, Bellingham, US, vol. 33, No. 7, pp. 2136-2142, Jul. 1, 1994.

* cited by examiner

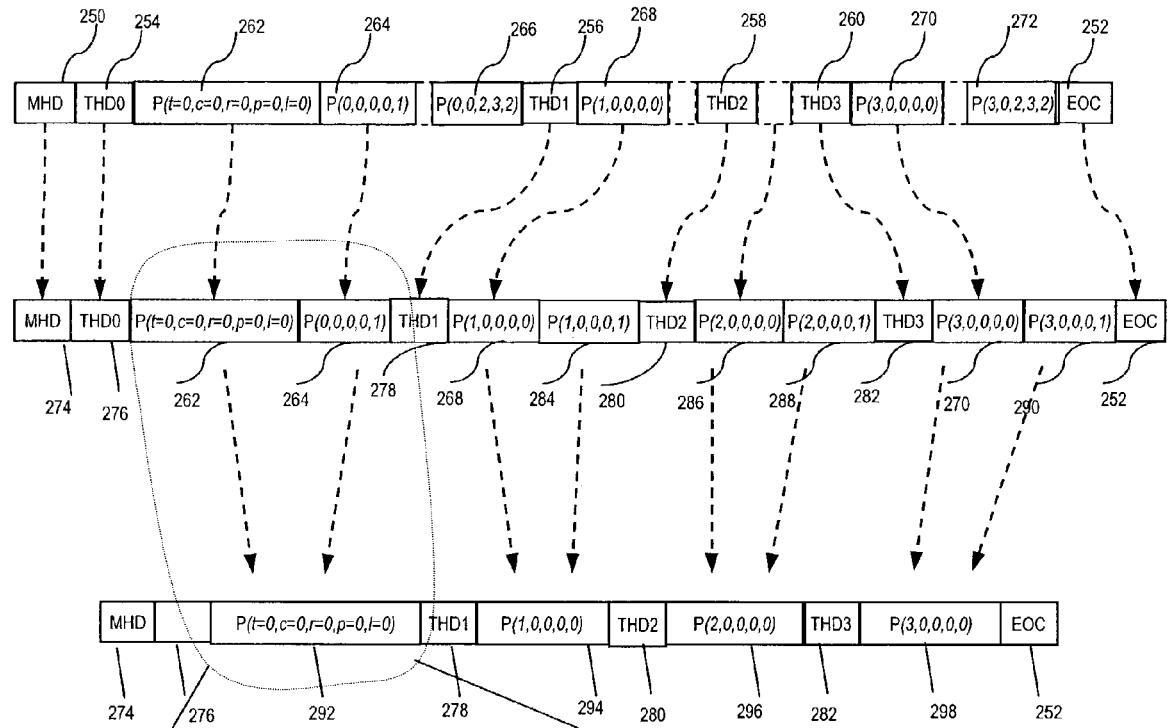
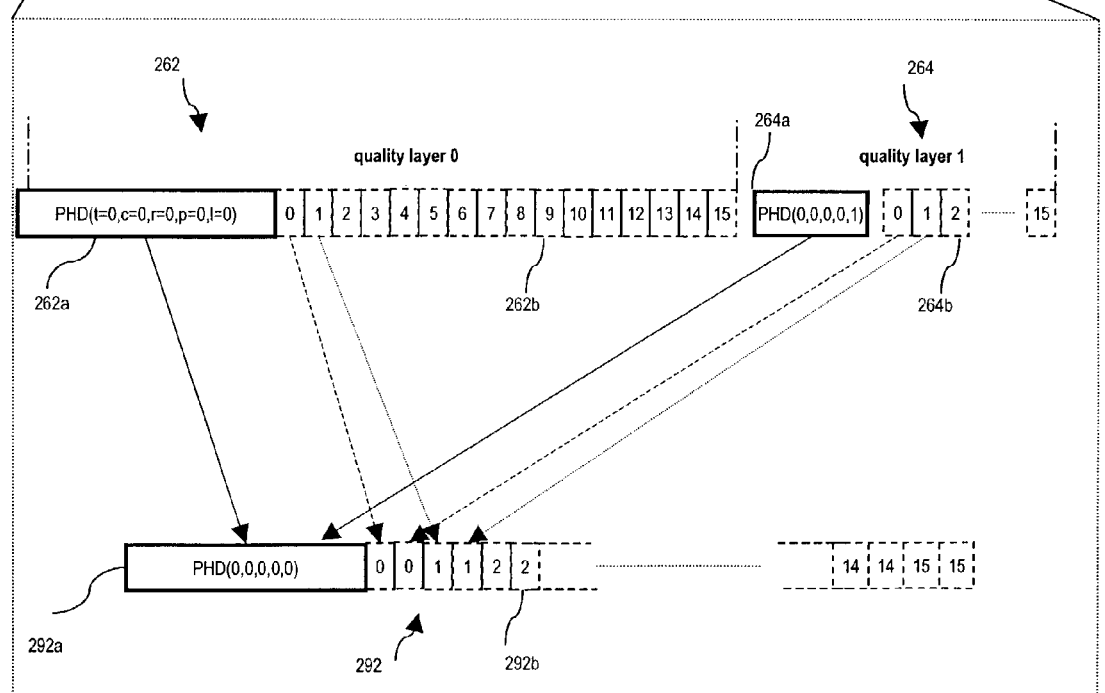
Fig. 9a
Fig. 9b

METHOD AND DEVICE FOR FORMING A REDUCED COMPRESSED DIGITAL SIGNAL

The invention concerns a method and device for forming a reduced compressed digital signal from an initial compressed digital signal with several hierarchical levels which has been obtained by compression, according to a hierarchical compression format, of a digital signal comprising data representing physical quantities, the initial signal thus compressed comprising at least one header which comprises information representing the configuration of the signal and the structure of the data in it, the configuration of the signal being defined by an initial set of parameters characterizing all the hierarchical levels of the signal.

The invention applies in particular in the field of the processing of compressed images and, for example, for images in accordance with the standard JPEG2000.

The invention also applies in the field of the processing of other digital signals such as video sequences or sound signals.

It is known that some digital data processing apparatus such as for example digital photographic apparatus, cellular telephones or personal digital assistants of the PDA type have, in their internal memories, several digital signals stored in compressed form.

The stored signals, which are, by way of example, image signals, may for example correspond to data acquired by the apparatus or received by it from an external source via a communication network.

When the user of the data processing apparatus wishes to transmit, via a communication network, the image signals thus stored to a distant communication apparatus (e.g. a server) for example with a view to the subsequent use of one or more of the signals, it may be desirable, for various reasons, not to transmit all these image signals.

This is explained for example when the files containing these signals are too bulky and their transfer time will therefore be relatively long.

Another reason is that the communication network may convey a large amount of traffic and therefore leave little bandwidth available for the transmission of all the signals.

Moreover, the transmissions on the network may be affected by high transmission errors, or even cause losses of data, thus making the transmission of the signals in their entirety very haphazard.

In addition, the distant apparatus for which these signals are intended may have a relatively small storage capacity, which makes it difficult, or even impossible, to store several files containing the whole of several signals.

For all these non-exhaustive reasons, the data processing apparatus containing several compressed digital signals may, in a known manner, process those signals by reducing the size of the images, in order to reduce the volume of the data to be transmitted to the distant apparatus.

It should be noted that the compression of a digital image generally comprises two steps.

A first step concerns a spatio-frequency transformation of the image, for example of the discrete cosine transform type known by the abbreviation DCT, during which the digital data of the image or pixels are transformed into frequency sub-band coefficients.

Often the coefficients thus obtained are quantized.

The second step concerns an entropic coding of the transformed, possibly quantized, coefficients in order to supply the compressed image signal.

It is known that the size of images which are, for example, compressed to the JPEG format may be reduced by first of all carrying out an entropic decoding of the blocks of pixels 8×8 of the compressed image.

One method of modifying the size of a JPEG image in the compressed domain is cited in the article entitled "A fast scheme for image size change in the compressed domain" by Rakesh Dugad and Narendra Ahuja, IEEE Transactions on Circuits and Systems for Video Technology, April 2001, vol. 11 No. 4, pp 461-474.

After decoding of the blocks, a subset of low-frequency coefficients containing a given number of coefficients ordered from the coefficient of lowest frequency is extracted from each block.

The set of coefficients extracted is transformed, thus giving rise to new 8×8 blocks of coefficients.

The coefficients of these new blocks next undergo an entropic coding step in order to re-form a reduced compressed image signal, that is to say one of reduced size but which keeps the semantics of the initial image signal.

The principal drawback of this method is the fact that the data processing apparatus sometimes has insufficient processing capacity to effect such a processing of the compressed image signals.

Moreover, the time necessary for thus processing all the compressed image signals before transmitting them may be relatively long, and therefore excessively monopolize the processing unit of the apparatus.

Another known method for reducing the size of the signal is to decompress the initial compressed signal and then to sub-sample the initial signal by selecting a number x of pixels out of a number y of pixels of the signal, where x and y are integers, with x<y.

This method also includes additional steps of filtering the sub-sampled signal and of compression.

However, this relatively complicated method may prove to be difficult or even impossible to implement when the data processing apparatus has insufficient processing capacity.

The present invention aims to remedy at least one of the aforementioned drawbacks by proposing a method of forming a reduced compressed digital signal, characterized in that the reduced compressed digital signal is formed from an initial compressed digital signal with several hierarchical levels which has been obtained by the compression, according to a hierarchical compression format, of a digital signal comprising data representing physical quantities, the initial signal thus compressed comprising at least one header which comprises information representing the configuration of the signal and the structure of the data in it, the configuration of the signal being defined by an initial set of parameters characterizing all the hierarchical levels of the signal, said method comprising the following steps:

from said at least one header of the initial compressed signal, forming at least one header of the reduced compressed signal which comprises information representing a reduced configuration of the initial signal and the structure of the data in the compressed signal of reduced configuration, the reduced configuration being defined by a final set of parameters characterizing at least one of the hierarchical levels of the initial compressed signal, extracting the compressed data corresponding to the final set of parameters from the initial compressed signal, and inserting this data in the reduced compressed signal being formed.

Correlatively, the invention also concerns a device for forming a reduced compressed digital signal, characterized in that the reduced compressed digital signal is formed from an initial compressed digital signal with several hierarchical levels which has been obtained by the compression, according to a hierarchical compression format, of a digital signal comprising data representing physical quantities, the initial signal thus compressed comprising at least one header which comprises information representing the configuration of the signal and the structure of the data in it, the configuration of the signal being defined by an initial set of parameters characterizing all the hierarchical levels of the signal, said device comprising:

means for forming at least one header of the reduced compressed signal from said at least one header of the initial compressed signal, said at least one header of the reduced compressed signal comprising information representing a reduced configuration of the initial signal and the structure of the data in the compressed signal of reduced configuration, the reduced configuration being defined by a final set of parameters characterizing at least one of the hierarchical levels of the initial compressed signal, means for extracting the compressed data corresponding to the final set of parameters from the initial compressed signal, and means for inserting this data in the reduced compressed signal being formed.

The representation of the compressed signal with several hierarchical levels makes it possible to select, in this signal, a configuration which is reduced compared with its total configuration and which corresponds to at least one hierarchical level of said signal.

The hierarchical levels of the signal are "interleaved" in each other, in that there exists a basic level and several successive refinement levels (e.g. resolution, quality, etc.).

The hierarchical levels being interleaved in each other, so that when a configuration corresponding to one hierarchical level is selected, then the lower hierarchical levels interleaved in this level are also selected.

Through this representation with hierarchical levels, the compressed data corresponding to the hierarchical level of the configuration selected and to any above-mentioned lower hierarchical levels can be extracted from the initial compressed signal and inserted in the reduced compressed signal currently being formed, without previously being decoded and recoded.

The volume of this extracted and inserted compressed data is reduced compared with the total volume of the compressed data of the initial signal, which despite everything makes it possible to interpret the signal thus reduced, despite reduced quality.

Thus the reduced signal which is formed according to the invention occupies a less bulky file than the entire signal.

The result is a saving in terms of use of the bandwidth allocated to the transmission of the signal on the communication network, as well as a reduction in the transmission time for this signal.

In addition, the processing of the signal according to the invention represents a small calculation time compared with the prior art and requires few memory resources.

Moreover, the distant communication apparatus which receives the reduced compressed signal according to the invention can take a decision on the advantage of transmitting or not the initial compressed signal in its entirety, since the data received is sufficiently representative of the data of the initial signal, even if the quality of the reduced signal is somewhat affected by the configuration reduction.

The invention involves a number of steps which is as small as possible during the formation of the reduced compressed signal.

In the case of an image signal, it is possible to obtain a reduced configuration of the signal by reducing the resolution and/or the quality and/or the number of components of this signal.

According to one characteristic, the final set of parameters characterizing the hierarchical level of the reduced configuration selected and any lower hierarchical levels, if there are any, comprises at least one of the following parameters: resolution level, quality level, component of the signal.

According to a first embodiment, the method comprises the following steps:

extracting and inserting said at least one header of the initial compressed signal in the reduced compressed signal being formed, and modifying said at least one inserted header according to the compressed data inserted.

According to a second embodiment, the method comprises the following steps:

obtaining information representing the reduced configuration of the initial signal and the structure of the data corresponding to the reduced configuration, and inserting this information in the reduced compressed signal being formed in order to form said at least one header of this signal.

According to one characteristic, the method comprises a step of simplifying the structure of the reduced compressed signal.

This simplification of the structure proves useful, for example, when it is wished to reduce the time devoted to the decompression of the reduced signal received by the distant communication apparatus.

This may appear all the more useful when the calculation power of the distant communication apparatus is not very high or it is wished to lighten the task of the calculation unit associated with this apparatus.

It is also possible, before envisaging a simplification of the structure of the reduced compressed signal, to provide for a test step according to at least one predetermined criterion which may, for example, be the calculation power of the apparatus receiving the reduced compressed signal.

It should be noted that the simplification of the structure of the reduced compressed signal may also prove to be useful when it is wished to transmit a bit stream which is as small as possible.

According to one characteristic, the compressed data of the reduced compressed image signal is organized into data packets P which, in their turn, are organized into ordered data blocks, each packet comprising a packet header and a packet body containing data blocks, a packet P corresponding to a resolution level, to a quality level, to a component of the signal and, when the initial signal has been decomposed into frequency sub-bands, to a set of data blocks of the decomposed signal, referred to as the spatial position, and having a given spatial location in the sub-band or sub-bands constituting one and the same resolution level.

According to a characteristic depending on the previous one, the step of simplifying the structure of the signal comprises, more particularly, the following steps for each resolution level of the reduced compressed signal:

merging, into a single data packet header, the headers of various packets to which the simplification relates, merging, into a single packet body, the bodies of the various packets concerned, said merging of the bodies including a resequencing of the data blocks contained in these bodies.

In this way the number of data packets in the reduced configuration signal being formed is reduced, after the data packets corresponding to the reduced configuration of the initial compressed signal have been inserted.

It should be noted that the insertion and merging of these packets may, as an alternative, be carried out simultaneously.

Several types of simplification are to be envisaged for an image signal.

According to one characteristic, the resequencing of the blocks depends on the type of simplification envisaged.

According to a first characteristic, when the reduced compressed signal comprises several spatial positions for one and the same resolution level, the merged packets are those allocated to these different spatial positions.

According to a second characteristic, when the reduced compressed signal comprises several quality levels for one and the same resolution level, the merged packets are those which contribute to these different quality levels.

According to a third characteristic, the reduced compressed signal comprises, for one and the same resolution level, several quality levels and several spatial positions, the merged packets being those which contribute both to the various spatial positions and to the various quality levels.

As for the resequencing of the blocks, this is performed in a manner adapted to the type of simplification envisaged.

Thus, if the simplification aims to reduce the number of spatial positions per resolution level, and this for all the resolution levels of the reduced signals, the blocks are resequenced in the body of the single packet, resulting from the merging of the packets for the resolution level in question, in the spatial order of running through said blocks which is in accordance with the description syntax of the signal.

If the simplification aims to reduce the number of quality levels per resolution level, and thus for all the resolution levels of the reduced signal, the blocks of data are resequenced in the body of the single packet, for the resolution level in question, by concatenating the contributions of the same data block to the various quality levels, in increasing order of these levels and in the spatial order of running through said blocks which is in accordance with the description syntax of the signal.

If the simplification aims to reduce, for one and the same resolution level, the number of quality levels and the number of spatial positions, and thus for all the resolution levels of the reduced signal, the data blocks are resequenced in the body of the single packet in the order of spatial travel of these blocks which is in accordance with the description syntax of the signal and, for each block, by concatenating the contributions of this block to the various quality levels.

According to another characteristic, the method comprises a different step of processing the header of the single packet depending on whether or not the merging of the data packet concerns solely spatial positions of the signal.

According to one characteristic, the step of modifying said at least one header of the initial compressed signal, according to the first embodiment mentioned above, takes place after the step of simplifying the structure of the reduced compressed signal.

According to one characteristic, the steps of obtaining and inserting information, according to the second embodiment mentioned above, take place after the step of simplifying the structure of the reduced compressed signal. This makes it possible to avoid having recourse to an additional step of updating the header or headers thus formed, in the case where the structure simplification takes place after formation of this header or headers.

The invention also concerns a data processing apparatus comprising a device for forming a reduced compressed digital signal as briefly described above.

According to another aspect, the invention also relates to:
an information storage means which can be read by a computer or microprocessor comprising code instructions of a computer program for executing the steps of the method of forming a reduced compressed digital signal according to the invention like the one briefly described above, and
a partially or totally removable information storage means which can be read by a computer or a microprocessor comprising code instructions of a computer program for executing the steps of the method of forming a reduced compressed digital signal according to the invention like the one briefly disclosed above.

According to yet another aspect, the invention relates to a computer program which can be loaded into a programmable apparatus, comprising sequences of instructions or portions of software code for implementing the steps of the method of forming a reduced compressed digital signal of the invention as briefly disclosed above, when said computer program is loaded and executed on the programmable apparatus.

The characteristics and advantages relating to the device for forming a reduced compressed digital signal, to the data processing apparatus comprising such a device, to the information storage means and to the computer program being the same as those disclosed above concerning the method of forming a reduced compressed digital signal according to the invention, they will not be repeated here.

Other characteristics and advantages of the present invention will emerge more clearly from a reading of the following description, given with reference to the accompanying drawings, in which:

FIG. 8b illustrates the resequencing of the data blocks in the case depicted in FIG. 8a;

FIG. 9a illustrates the mechanism of merging the packets in the case of reduction of the number of quality levels;

FIG. 9b illustrates the resequencing of the data blocks in the case depicted in FIG. 9a.

Figure 1A:
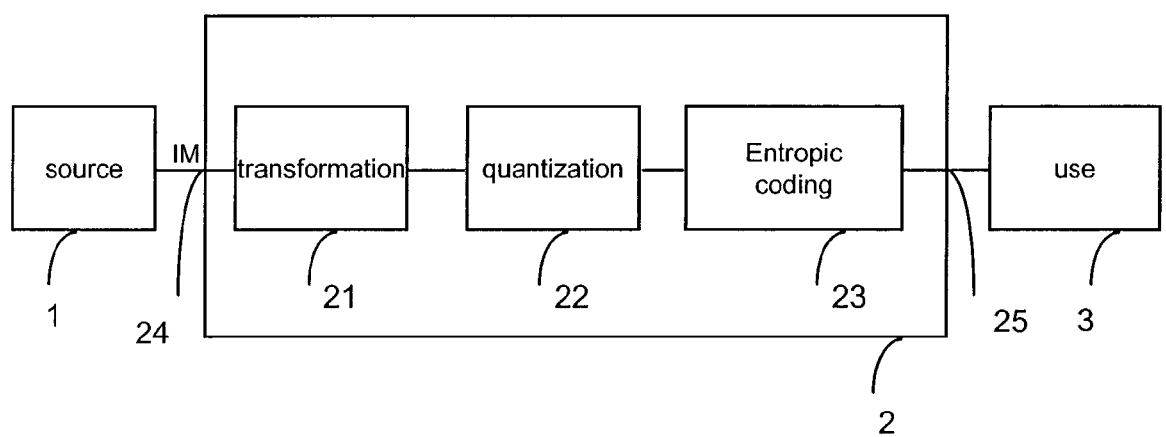
FIG. 1a depicts in a schematic and known manner a device for compressing a digital signal.

FIG. 1a depicts a data compression device 2 which has an input 24 to which there is connected a source 1 of original non-compressed digital data.

The source 1 has for example a memory means, such as a random access memory, hard disk, diskette or compact disc, for storing non-compressed data, this memory means being associated with an appropriate reading means for reading the data therein. A means for recording the data in the memory means can also be provided.

It will be considered more particularly hereinafter that the original data to be compressed is a series of digital samples representing physical quantities and representing for example an image IM.

This image is for example more particularly in accordance with the standard JPEG2000, which will be dealt with further below.

The source 1 supplies a digital image signal IM to the input of the compression device 2. The image signal IM is a series of digital words, for example bytes. Each byte value represents a pixel of the image IM, here with 256 levels of gray, or black and white image. The image can be a multi-spectral image, for example a color image having components in three frequency bands, of the red-green-blue or luminance and chrominance type. Either the color image is processed in its entirety, or each component is processed in a similar manner to the mono-spectral image.

Means 3 using compressed data are connected at the output 25 of the compression device 2.

Figure 1B:
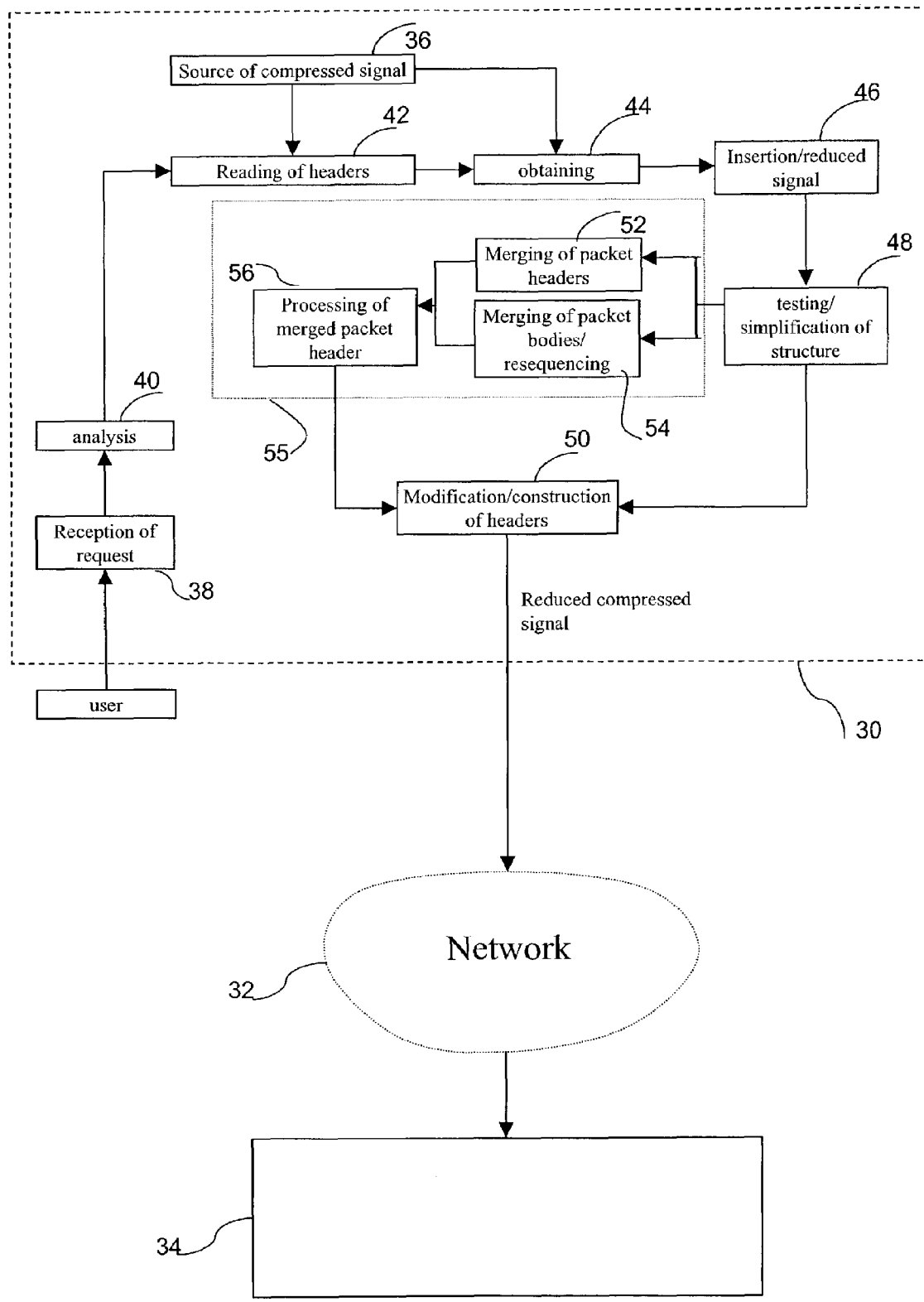
FIG. 1b depicts schematically a device for forming a reduced compressed digital signal according to the invention in a communication architecture of the client-server type.
Figure 2:
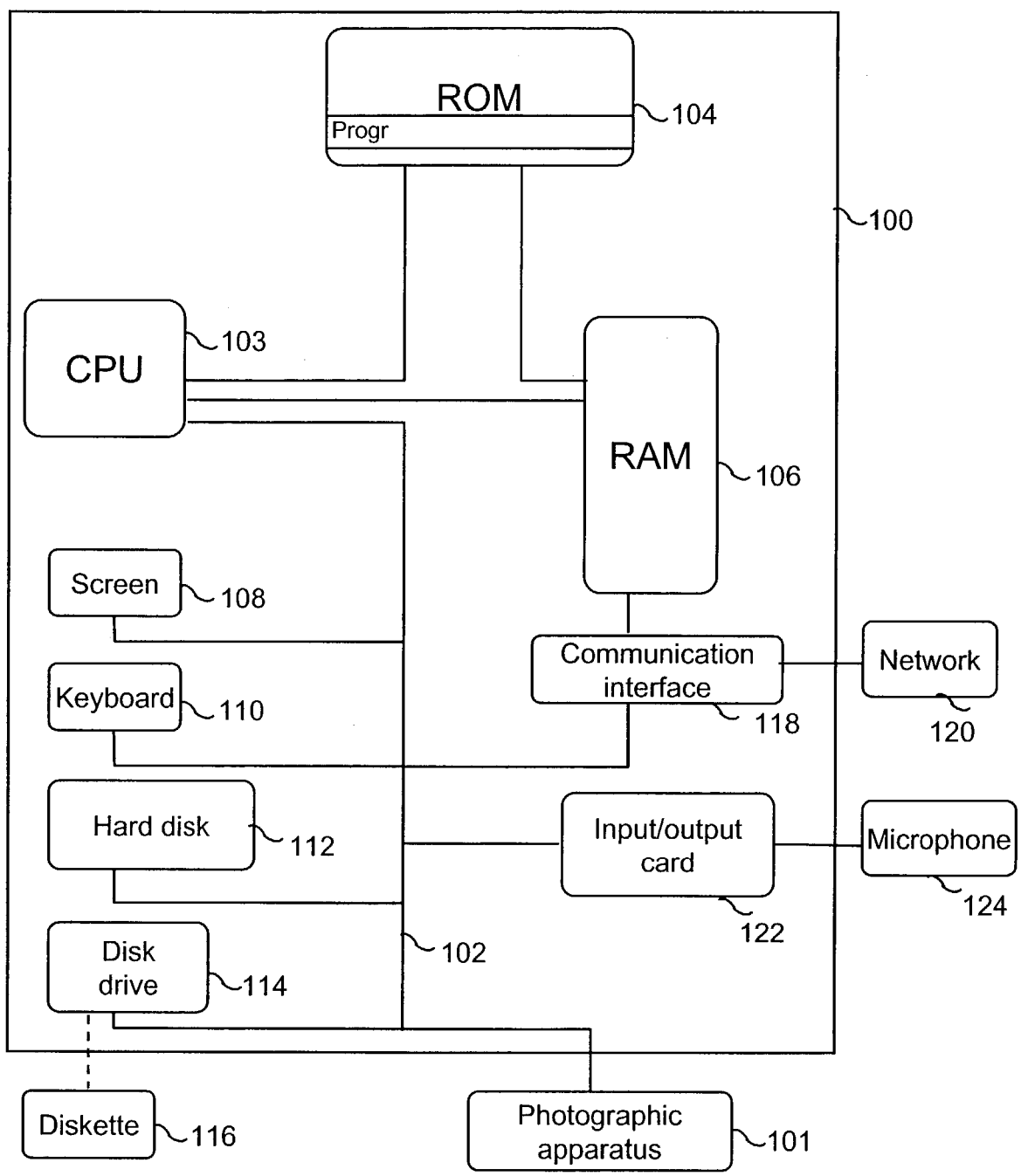
FIG. 2 is an embodiment of a programmable apparatus implementing the invention.

The user means 3 include for example means for storing compressed data, and/or means for transmitting compressed data to the device according to the invention which is depicted in FIG. 1b or in FIG. 2.

The compression device 2 can also be included in the device according to the invention in FIG. 1b or FIG. 2.

The compression device 2 conventionally has, as from the input 24, a spatio-frequency transformation circuit 21 which implements decompositions into signals of frequency sub-bands of the data signal, so as to reflect an analysis of the signal.

However, the decomposition into frequency sub-bands is not essential.

Other transformations can of course be envisaged.

It should be noted that it is possible to dispense with the spatio-frequency transformation circuit.

However, the decomposition into frequency sub-bands of a signal is useful for the disclosure of the embodiment of the invention.

The transformation circuit 21 is connected to a quantization circuit 22. The quantization circuit implements a quantization known per se, for example a scalar quantization or a vector quantization, of the coefficients, or groups of coefficients, of the frequency sub-band signals supplied by the circuit 21.

The circuit 22 is connected to an entropic coding circuit 23, which performs an entropic coding, for example a Huffman coding, or an arithmetic coding, of the data quantized by the circuit 22.

The initial digital image signal was compressed by the compression device 2 according to a hierarchical compression format, which confers on it a representation with several hierarchical levels interleaved in each other.

The set of hierarchical levels of the signal corresponds to the configuration of this signal which is defined by an initial set of parameters.

The initial compressed digital image signal has a general structure which has a main header which will be described in more detail below and a body containing, in compressed form, the original data referred to above and which is grouped together into data blocks (e.g. "code blocks") ordered in the signal. It should be noted that the blocks have been compressed independently of each other.

The initial compressed signal contains information which represents the configuration of the signal (initial set of parameters) and the structure of the compressed data in the body of this signal.

This information is contained in the main header.

The end of the digital signal is indicated by a marker.

More particularly, the image signal is for example partitioned into areas known as tiles which are themselves each partitioned into data blocks.

In this case, the initial compressed signal also contains tile headers and the information representing the configuration of the signal and the structure of the compressed data is then contained in the main header and in the tile headers.

It should be noted that, in the context of JPEG2000, the data of a compressed image digital signal is organized into data packets which are indexed according to various parameters consisting of the tiles, the components, the resolution levels, the spatial positions ("precincts") and the quality levels or layers.

A spatial position ("precinct") is a set of data blocks which, within the frequency sub-bands of the same resolution level, occupies the same spatial location.

A data packet contains a packet header which forms part of the header information mentioned above and a packet body. This header describes notably the content of the data included in the packet body.

The body of each packet includes data blocks (e.g. code blocks) which are each compressed according to several incremental quality levels or layers: a base layer and refinement layers.

One and the same data block corresponding to a precise spatial position of the image has various quality levels present in the respective bodies of different packets.

A data packet of an image signal according to JPEG2000 therefore contains a set of data blocks corresponding to a given tile t, a component c, a resolution level r, a spatial position p and a quality level l.

The initial set of parameters defining the configuration of the initial compressed signal corresponds, in this example embodiment, to the set of aforementioned parameters c, r, l.

The invention proposes in fact to reduce the number of components and/or the resolution and/or the quality of the initial image signal.

In addition, it is also possible to modify the order of progression of the packets of the initial signal (organization of the data packets in the bit stream) in correspondence with at least one of the aforementioned reductions.

The image compressed representation syntax of JPEG2000 makes it possible, as will be seen subsequently, to select a reduced configuration of a compressed image signal and the corresponding compressed data, without needing to perform an entropic decoding of this data and then a subsequent entropic coding.

It should be noted that the invention is not limited to the images in accordance with this standard, nor even to the image signals.

This is because it is necessary for the compressed representation of the signal to be at several hierarchical levels for the invention to apply and such a representation exists for other types of digital signals such as for example video signals and sound signals.

The constitution of the main header and the tile headers of an image signal in accordance with JPEG2000 will now be dealt with in more detail.

This description of the constitution of the headers will be useful during the description given below with reference to FIGS. 5 and 6 concerning the modification of the headers in accordance with the invention.

The main header of a JPEG2000 image consists of a set of fields indicating various parameters of the compressed image, and options used for compressing this image. These fields consist of a marker identifying the nature of the field, followed by information given by the field. In JPEG2000 terminology, these fields are also referred to as "marker segments".

The fields or marker segments which can appear in a main header and their definitions are as follows:

SIZ: size of the decompressed image, size of the tiles, number of components, sub-sampling of the different components, COD: order of progression, number of layers, used transformation of components (e.g. color transformation), COC: coding style, number of decomposition levels, size of blocks, wavelet transformation, sizes of spatial positions, QCD: type of quantization used and quantization parameters, QCC: type of quantization used for a particular component, RGN: presence of a region of interest, POC: starting and end points of orders of progression (organization of the data packets in the bit stream), PPM: packet headers connected together in the main header, TLM: respective lengths of the tiles and tile segments or "tile parts" (segments of bit stream obtained when a partitioning of the tiles is used), PLM: lengths of packets, CRG: configuration (sub-sampling) of one component with respect to the others, COM: non-structured information (any comments).

All the parameters liable to be modified by the signal configuration reduction and being able to have an influence on the fields referred to above are as follows:

number of resolution levels,
number of quality levels or layers,
number of components,
order of progression,
length of tiles,
number of packets,
lengths of packets.

A tile header of a JPEG2000 image contains a set of fields or marker segments which are very similar to that of the main header. The differences separating them are as follows:

the fields SIZ, TLM and CRG do not exist in the tile headers;

the field PPT is the counterpart of the field PPM for the tile headers and indicates that the packet headers of the tile in question are collected together in the header of the tile;

the field PLT is the counterpart of the field PLM for the tile headers and indicates the respective lengths of the packets contained in the tile in question.

As depicted in FIG. 1b, a device 30 for forming a reduced compressed signal according to the invention is in communication, by means of a communication network 32, with a distant communication apparatus 34 such as for example a server, in which there is an image signal data base to the JPEG2000 format.

The device 30 according to the invention is for example a mobile device such as a digital photographic apparatus which is able to pick up image signals and compress them to the JPEG2000 format.

Instead of routinely transmitting all the compressed image signals to the server 34, the device 30 according to the invention makes provision for forming, for each initial compressed image signal, a reduced version of the compressed image signals known as a "thumbnail image".

These reduced compressed signals or thumbnail images will next be transmitted to the server 34, which will then be able to decide, according to the content of the thumbnail images received, whether the transmission of one or more complete initial compressed signals is necessary.

This makes it possible in fact to avoid transmitting excessively bulky files between the device 30 and the server 34 which could occupy the bandwidth available on the communication network 32 for an excessively long time, or even be affected by transmission errors.

This can also be advantageous when the distant communication apparatus 34 has limited memory resources and/or insufficient calculation power, or when the processing unit of the distant apparatus 34 must not be monopolized for too long by tasks of decompression of the received images.

It should be noted that the device 30 can, as an alternative, be associated with a digital signal acquisition apparatus. In this case, the device 30 according to the invention then has only the various elements serving to form a reduced compressed signal from an initial compressed signal acquired by the apparatus.

In the representation given in FIG. 1b, a compressed signal source 36 is included in the device 30 according to the invention.

The user communicates, for example, by means of a keyboard, not shown, a request to the device 30 in order to indicate to it the final set of parameters characterizing at least one of the hierarchical levels of the initial compressed signal and thus defining a reduced configuration of the signal which is to be taken into account.

The user can thus for example specify the resolution, the number of quality levels or layers and the number of components which he wants for the reduced configuration signal.

The device 30 has for this purpose a request reception unit 38 transmitting the request thus received to an analysis unit 40. The unit 40 delivers at an output, to a unit 42, the parameters of the final set characterizing all the hierarchical levels corresponding to the reduced configuration (c, r, l).

For example, for an initial signal of configuration (c=2, r=5, l=10), the parameters of the final set are c=2, r=2 and l=1.

Thus the parameters of the final set characterize the maximum hierarchical level c=2, r=2 and l=1 as well as the lower hierarchical levels interleaved in the maximum level and which correspond to a set of all the values of c, r and l respectively equal to 0,1(c), 0,1(r) and 0(l).

In addition, a modification of the order of progression of the data in the reduced compressed signal can also be introduced at the request of the user.

The unit 42 is a unit for reading the main header and the tile headers of the initial compressed signal coming from the source 36.

In these headers, which were described in detail above, there is the information representing the configuration of the initial compressed signal and the structure of the data in the latter.

The device 30 also has a unit 44 which is connected to the unit 42 and to the source of the compressed signal 36 and whose function is to obtain, from the initial compressed signal, header information and compressed data of the body of the initial compressed signal.

The unit 44 can function in two different ways.

According to a first embodiment, the unit 44 extracts the main header of the initial compressed signal as well as the tile headers of this signal and transmits them to a unit 46 which then inserts them in the compressed signal of reduced configuration which is in the process of being formed.

The unit 44 also extracts from the body of the initial compressed signal the compressed data of this signal which corresponds to the final set of parameters supplied by the user and defining the reduced configuration of the signal in the process of being formed.

According to a second embodiment, the unit 44 obtains, from a reading of the main header and the tile headers of the initial compressed signal and of the aforementioned final set of parameters, information representing on the one hand the reduced configuration chosen for the signal in the process of being formed and on the other hand the structure of the data corresponding to this reduced configuration.

The unit 46 then proceeds with the insertion, in the reduced configuration signal in the process of being formed, of compressed data of the initial compressed signal and which corresponds to the final set of parameters defining the reduced configuration.

The device has a test unit 48 which determines, according to at least predetermined criterion, whether a simplification of the structure of the reduced compressed signal issuing from the unit 46 must take place or not, whatever the embodiment envisaged.

It should be noted that the predetermined criterion may for example be the calculation power of the apparatus 30 and/or of the distant communication apparatus 34 and/or the high number of quality levels or spatial positions contained in the reduced signal thus formed.

Where the calculation power of the communication apparatus 34 is judged to be sufficient or, according to the predetermined criterion adopted, when the number of quality levels and the number of spatial positions of the reduced signal formed is not too high, then the reduced compressed signal coming from the unit 46 and supplied to the unit 48 can be transmitted as it is to a unit 50.

Where the functioning of the units 44 and 46 has taken place in accordance with the first embodiment mentioned above, the function of the unit 50 is to modify the main header and the tile headers inserted in the reduced compressed signal according to the compressed data which has been inserted in this signal in order to adapt these headers.

The reduced compressed signal issuing from the unit 50 is then in a position to be transmitted to the distant apparatus 34 via the network 32.

When a simplification of the structure of the signal has not been decided and the functioning of the units 44 and 46 has taken place in accordance with the second embodiment, the reduced compressed signal is delivered by the unit 48 to the unit 50.

In this case, the function of the unit 50 is on the one hand to form a main header and tile headers from the aforementioned information obtained by the circuit 44, taking account of the data inserted, and on the other hand to insert these headers in the compressed signal of reduced configuration in the process of being formed.

There is thus formed, in the reduced configuration signal, a main header and tile headers adapted to the compressed data inserted in this signal.

On the other hand, when the decision to simplify the structure of the reduced compressed signal delivered by the unit 46 is taken, this signal is injected into two units 52, which at least partially constitute a unit for simplifying the structure of the signal 55.

The unit 52 is a unit for merging the headers of the various packets to which the simplification relates in a single packet header, for each resolution level of the reduced compressed signal.

In parallel, the unit 54 is a unit for merging the bodies of the various packets mentioned above into a single packet body.

The unit 54 also carries out a resequencing of the data blocks contained in these packets when the bodies are merged.

It will be seen subsequently, during the description given with reference to FIG. 7, that the resequencing of the data blocks is different according to the type of simplification performed.

Amongst the types of simplification proposed, it is possible to reduce, for the same resolution level, the number of spatial positions in the reduced compressed signal or to reduce the number of quality levels of the signal or to reduce the number of quality levels and spatial positions.

The unit for simplifying the structure 55 also has a unit 56 which, for each resolution level, performs, on the merged packet issuing from the units 52 and 54, a processing of its header.

This processing is different depending on whether or not the merger of the data packets concerned solely the spatial positions of the reduced compressed signal.

There too, depending on whether the functioning of the units 44 and 46 took place in accordance with the first embodiment defined above or not, the reduced compressed signal with its structure simplified by the units 52 to 56 is sent to the header modification unit 50 according to the compressed data inserted in the signal.

The reduced compressed signal issuing from the device 30 according to the invention is transmitted via the network 32 to the distant communication apparatus 34. The signal received by the apparatus 34 is decompressed and its content is analyzed before taking a decision on any transmission of the initial compressed signal in its entirety.

It should be noted that the thumbnail images or reduced compressed image signals formed by the device 30 according to the invention correspond overall to the initial compressed signals issuing from the source 36, in the sense that these reduced signals keep the semantics of the initial signals, although their quality is somewhat affected by the configuration reduction.

The content of these reduced compressed signals is however sufficiently significant compared with the initial compressed signals for the apparatus 34 to be capable of making a decision on the possible transmission of the non-reduced configuration signals (e.g. image with full resolution and full quality).

With reference to FIG. 2, an example of a programmable data processing apparatus 100 implementing the invention is described. This apparatus is adapted to process a compressed initial digital signal.

To this end, the apparatus 100 comprises, for example, the device for forming a reduced compressed image signal according to the invention depicted in FIG. 1b.

According to the chosen embodiment depicted in FIG. 2, an apparatus implementing the invention is for example a microcomputer 100 connected to various peripherals, for example a digital photographic apparatus 101 (or a cellular telephone, a personal digital assistant of the PDA type, a digital camera, a scanner, or any image acquisition or storage means) connected to a graphics card and supplying data to be compressed.

The apparatus 100 has a communication bus 102 to which there are connected:

- a central unit 103 (microprocessor),
- a read only memory 104, containing a computer program "Progr",
- a random access memory 106, containing registers adapted to record variables modified during the execution of the aforementioned program,
- a screen 108 for displaying, for example, the image data coming from the apparatus 101 and which is not yet compressed, or serving as an interface with the user, who would be able to parameterize certain modes of forming the reduced compressed signal according to the invention, using a keyboard 410 or any other means, such as for example a mouse,
- a hard disk 112 which can also contain the aforementioned program "Progr",
- a disk drive 114 adapted to receive a diskette 116,
- an interface 118 for communication with a communication network 120 and which is able to transmit compressed data processed by the apparatus or able to receive compressed data to be processed by the apparatus.

The communication bus affords communication between the different elements included in the microcomputer 100 or connected to it. The representation of the bus is not limitative and, in particular, in the central unit is able to communicate instructions to any element of the microcomputer 100 directly or by means of another element of the microcomputer 100.

The program denoted "Progr" enabling the programmable apparatus to implement the invention can be stored for example in read only memory 104 (referred to as ROM in the drawing) as depicted in FIG. 2.

Although one program is identified, it is possible to have several programs or sub-programs to implement the invention.

According to a variant, the diskette 116, just like the hard disk 112, can contain compressed data to be processed as well as the code of the invention which, once read by the apparatus 100, will be stored in the hard disk 112.

The diskette, just like the hard disk, can also contain processed compressed data according to the invention.

In a second variant, the program can be received by means of the communication network 120, in order to be stored in a manner identical to that described above.

The diskettes can be replaced by any other information carrier such as, for example a CD-ROM or a memory card. In general terms, an information storage means, which can be read by a computer or by a microprocessor, integrated or not into the apparatus, possibly removable, stores a program implementing the method according to the invention.

In more general terms, the program can be loaded into one of the storage means of the apparatus 100 before being executed.

The central unit 103 will execute the instructions relating to the implementation of the invention, instructions stored in the read only memory 104 or in the other storage elements (hard disk). On powering up, the program or programs of forming a reduced compressed signal according to the invention, which are stored in a non-volatile memory, for example the ROM memory 104, are transferred into the random access memory RAM 106, which will then contain the executable code of the invention, as well as registers for storing the variables necessary for implementing the invention.

It should be noted that the data processing apparatus including a device for forming a reduced compressed digital signal according to the invention can also be a programmed apparatus.

This apparatus then contains the code of the computer program or programs, for example, fixed in an application specific integrated circuit (ASIC).

Moreover, the apparatus 100 including the device according to the invention which is depicted in FIG. 1b can, for example, be a digital photographic apparatus, a camcorder, a digital personal assistant, or even a cellular telephony apparatus.

Figure 3:
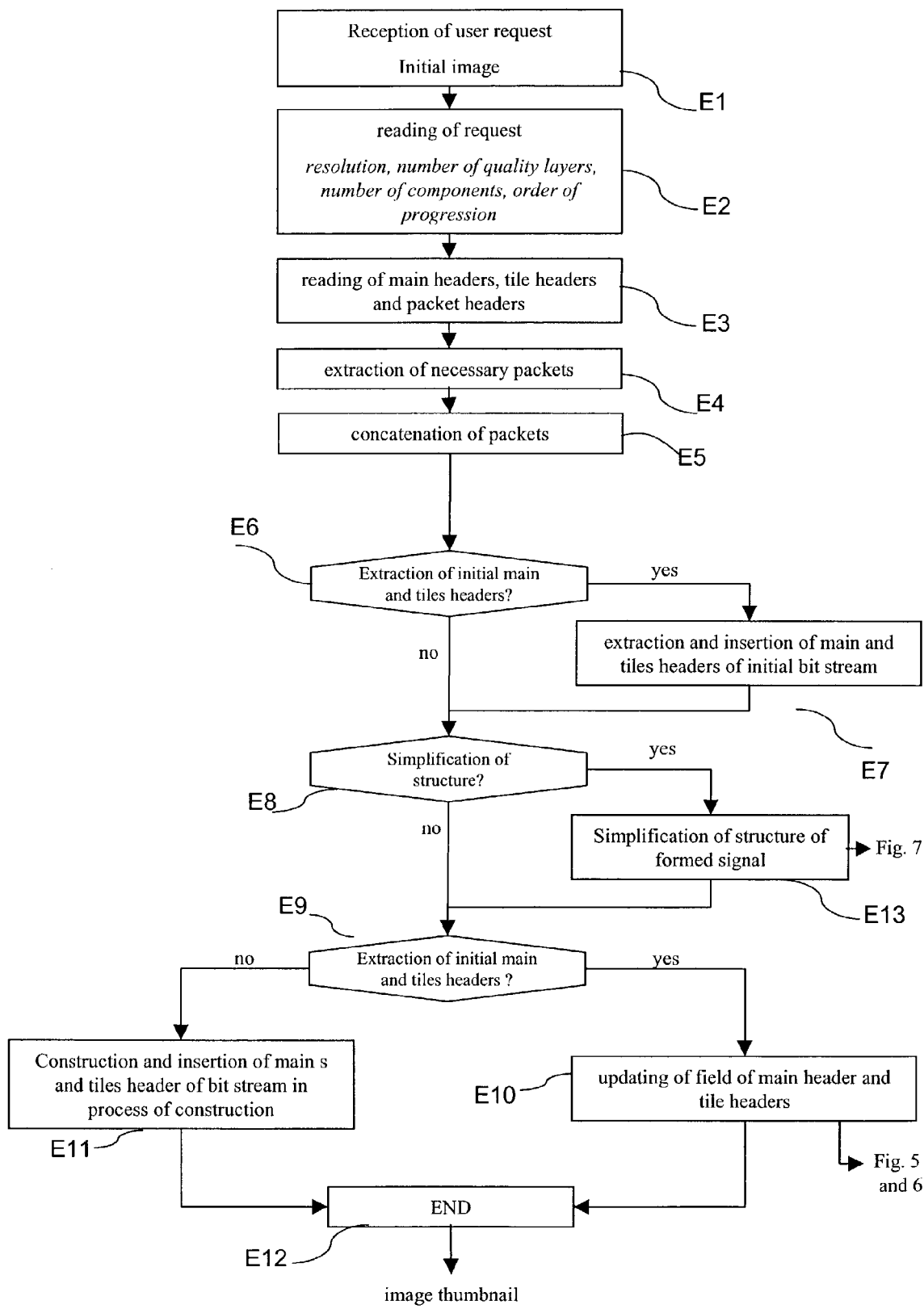
FIG. 3 is an algorithm comprising different steps of the method according to the invention.

FIG. 3 illustrates an algorithm containing various instructions or portions of software code corresponding to steps of the method of forming a reduced initial compressed signal according to the invention.

The computer program denoted "Progr" which is based on this algorithm is stored in the read only memory 104 in FIG. 2 and, when the system is initialized, is transferred into the random access memory 106.

The program is next executed by the central unit 103, which thus makes it possible to implement the method according to the invention in the apparatus of FIG. 2.

The different steps of the method illustrated by the instructions or portions of software code of the algorithm in FIG. 3 can also be implemented by the various units contained in the device 30 of FIG. 1b.

The algorithm in FIG. 3 includes a first step E1 of receiving a request supplied by a user and which contains the various parameters of the final set of parameters characterizing the hierarchical level or levels of the initial compressed signal defining the required reduced configuration.

These parameters are for example the number of resolution levels, the number of quality levels or layers, the number of components and possibly the order of progression required for organizing the data in the bit stream of the reduced compressed signal to be formed.

The user thus chooses for example a resolution level, a number of quality levels or layers and a number of components for defining the reduced configuration of the reduced compressed signal which will be formed.

During the following step E2, this request is analyzed and the parameters which have just been mentioned are read.

The following step E3 makes provision for reading and analyzing the main header and the tile headers of the initial compressed signal from which the reduced compressed signal will be formed.

These headers comprise information representing the configuration of the initial compressed signal and the structure of the data therein.

The configuration of the signal is defined by an initial set of parameters (components, resolutions, quality levels) characterizing all the hierarchical levels of this signal.

From this information contained in these headers, the method will make it possible to form the headers of the reduced compressed signal in the process of being formed and which will include information representing on the one hand the reduced configuration of the signal selected by the user and on the other hand the structure of the data in the compressed signal of reduced configuration.

This reduced configuration is defined by the final set of parameters mentioned above.

During the following step E4, the compressed data packets corresponding to the final set of parameters defining the reduced configuration are extracted from the initial compressed signal.

The step E4 is next followed by a step E5 during which the compressed data packets previously extracted are inserted by concatenation in the body of the reduced compressed signal in the process of being formed.

During this step, it is also possible to modify the order of progression of the data packets if the user so requires.

The algorithm includes a following test step E6 during which it is determined whether the main header and the tile headers of the initial compressed signal must be extracted from the latter and inserted in the reduced compressed signal in the process of formation.

According to the first embodiment, the following step E7 makes provision, in the affirmative, for extracting the main header and the tile headers from the initial compressed signal and inserting them in the reduced compressed signal in the process of formation.

Step E7 is then followed by test step E8.

When the test carried out at step E6 is negative, then a second embodiment applies and this step is directly followed by step E8.

The following step E8 makes provision for performing a test, according to at least one predetermined criterion, in order to determine whether or not a simplification of the structure of the reduced compressed signal is necessary.

The predetermined criterion, as seen above, may for example be the calculation power of the device 30 of FIG. 1b and/or of the distant communication apparatus 34 in this figure, or the number of spatial positions, or the number of quality levels present in the reduced compressed signal.

When it is decided not to simplify the structure, the test performed at step E6 is once again executed at step E9. If, as with step E6, the result of the test is positive, then the first embodiment applies, and step E9 is followed by a step E10. During this step the various fields making up the main header and the tile headers of the reduced compressed signal formed are modified in order to take account of the compressed data corresponding to the reduced configuration of the signal which has been inserted.

The updating of the fields of these headers will more particularly be described subsequently with reference to FIG. 5, for the main header, and FIG. 6 for the tile headers.

According to the second embodiment (negative result at the test of step E9), the following step E11 makes provision for obtaining, from the initial compressed signal, not all the information representing the configuration of this signal and the structure of the data therein, but information representing the reduced configuration and selected by the user and the structure of the data corresponding to this reduced configuration.

This information obtained is then inserted in the reduced compressed signal during this same step.

Unlike the first embodiment, the information representing the reduced configuration of the signal and the structure of the corresponding data, once inserted in the reduced compressed signal, constitute the definitive main header and tile headers of this signal.

It should be noted that the insertion of this information in the signal includes an operation of complete recoding of this information and an operation of writing the recoded information in said signal.

The coding process used is known from JPEG2000 standard, as will be seen subsequently.

When the test performed at step E8 results in a decision to simplify the structure of the reduced compressed signal formed, then this step is followed by a step E13 of simplifying the structure which will be described subsequently with reference to FIG. 7.

Step E13 is then followed by the already described step E9.

It should be noted that, in the case of simplification of the structure, it is advantageous for steps E10 and E11 to take place subsequently since, the structure simplification having repercussions on the headers of the signal formed, if the simplification were subsequent to steps E10 and E11, it will be necessary to provide, after the simplification, an additional step of updating the headers of the signal with a simplified structure.

An example of formation of a reduced compressed image signal or thumbnail image according to the invention will now be illustrated with reference to FIGS. 4a and 4b.

Figure 4A:
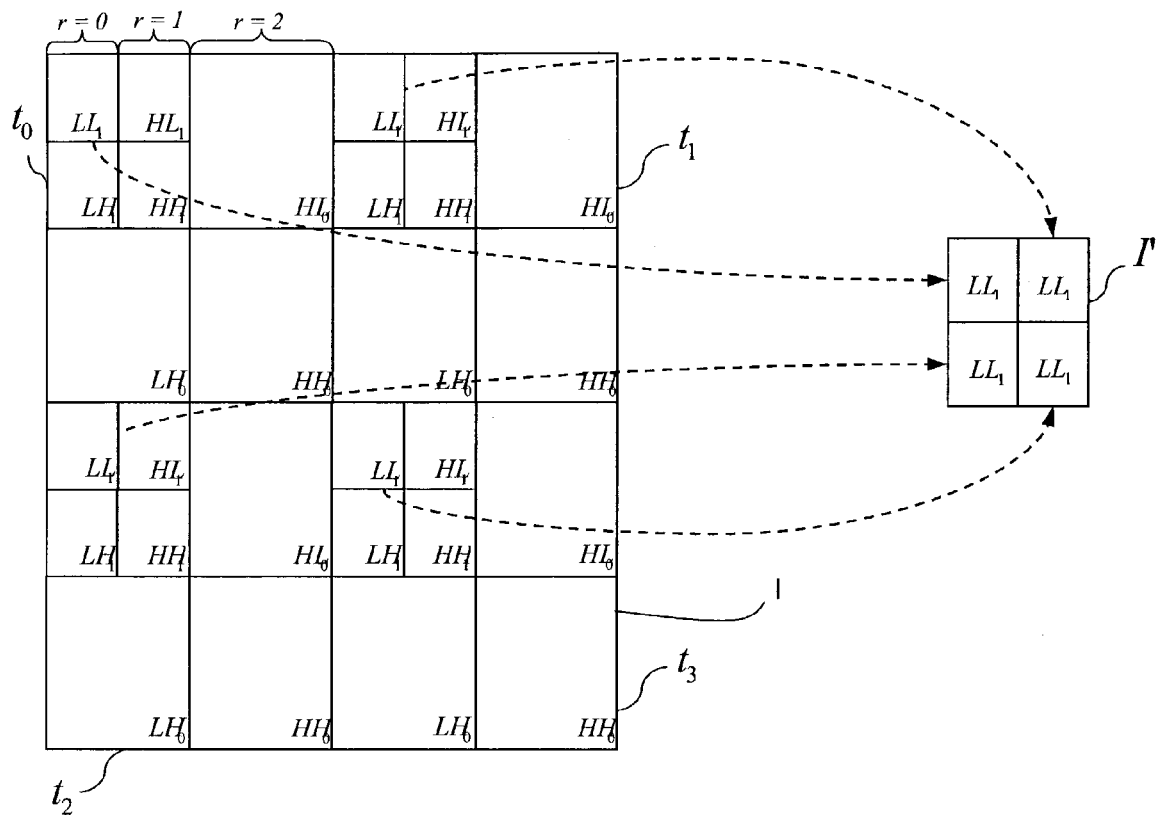
FIGS. 4a and 4b illustrate the formation of a compressed signal of reduced configuration according to the invention.

FIG. 4a depicts four tiles t0, t1, t2, t3 partitioning the initial compressed image signal I.

As depicted in this figure, each tile has been decomposed into frequency sub-bands on three resolution levels (r=0, r=1, r=2).

Each tile then has a low-frequency sub-band $LL_1$ (resolution 0), three low-frequency sub-bands for resolution level 1, $HL_1$, $LH_1$ and $HH_1$, as well as three high-frequency sub-bands for resolution 2, namely the sub-bands $HL_0$, $LH_0$ and $HH_0$.

In the example in question, the user has chosen, for parameters of reduced compressed signal or thumb nail image, resolution level r=0 of the initial image signal I and the first quality level l=0 of this image.

Having regard to the final set of parameters thus determined, the invention makes provision for extracting from each tile the data packets corresponding to resolution level 0 and quality level 0.

This is what is illustrated by the arrows in dotted lines starting from the various low-frequency sub-bands $LL_1$ which, collected together, form the reduced compressed signal I'.

Figure 4B:
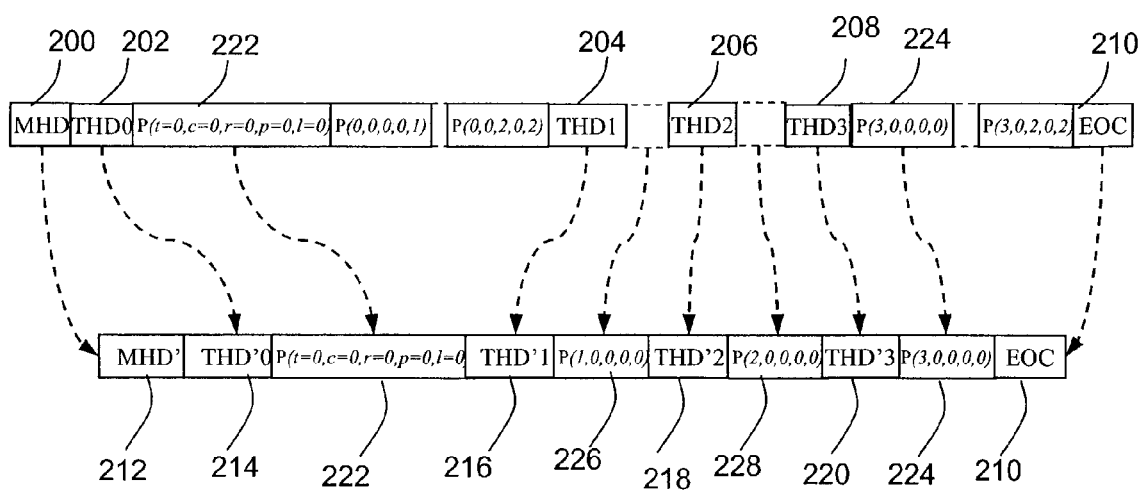

FIG. 4b depicts the structure of the initial compressed signal and that of the reduced compressed signal.

In this representation, the data packets P are denoted P(t, c, r, p, l) where t designates the tile concerned, c the component, r the resolution level, p the spatial position number (precinct), and l the index of the quality level or layer.

In the example in question, the number of spatial positions is fixed at 1 and the number of quality levels at 3.

The initial compressed signal includes a header denoted MHD referenced 200 and four tile headers THD0, THD1, THD2 and THD3 respectively referenced 202, 204, 206 and 208.

The signal ends with a marker EOC ("End of Codestream") and referenced 210, in accordance with JPEG2000 standard.

Given that each resolution level is formed by a single spatial position ("precinct"), only one packet for each tile corresponds to resolution level 0 and quality level 0.

It should be noted that the data packets in the compressed signal are for example organized progressively in terms of resolution.

As illustrated by the arrows in dotted lines in FIG. 4b, the invention makes provision for obtaining, from the initial compressed signal, information for forming the main header MHD' 212 and the tile headers THD'0, THD'1, THD'2 and THD'3 respectively denoted 214, 216, 218 and 220.

To do this, according to the two embodiments indicated above, either the headers of the initial compressed signal are completely inserted (first mode), or the main and tile headers are fully formed from information obtained on reading the headers of the initial signal and following on from the configuration reduction (second mode).

According to the first embodiment, the headers which are extracted from the initial compressed signal are modified in order to be consistent with the characteristics of the inserted compressed data (number of components, resolution levels, quality levels, order of progression etc.).

The headers of the reduced compressed signal MHD' and THD'i, with i=0, 1, 2, 3, are the headers resulting from this modification according to the compressed data inserted in the reduced compressed signal.

The invention therefore also makes provision for extracting from each tile the first packet denoted 222 for the first tile t0 and which corresponds to resolution level 0 and quality zero selected by the user, and to the single component 0 and to the single spatial position 0.

The same procedure is followed with all the first data packets of each tile as far as the data packet 224 of the tile t3.

In this way the compressed data packets denoted 222, 226, 228 and 224 are obtained in the reduced compressed signal, for each tile.

Moreover, the end of signal marker 210 is for its part inserted in the reduced compressed signal.

Figure 5:
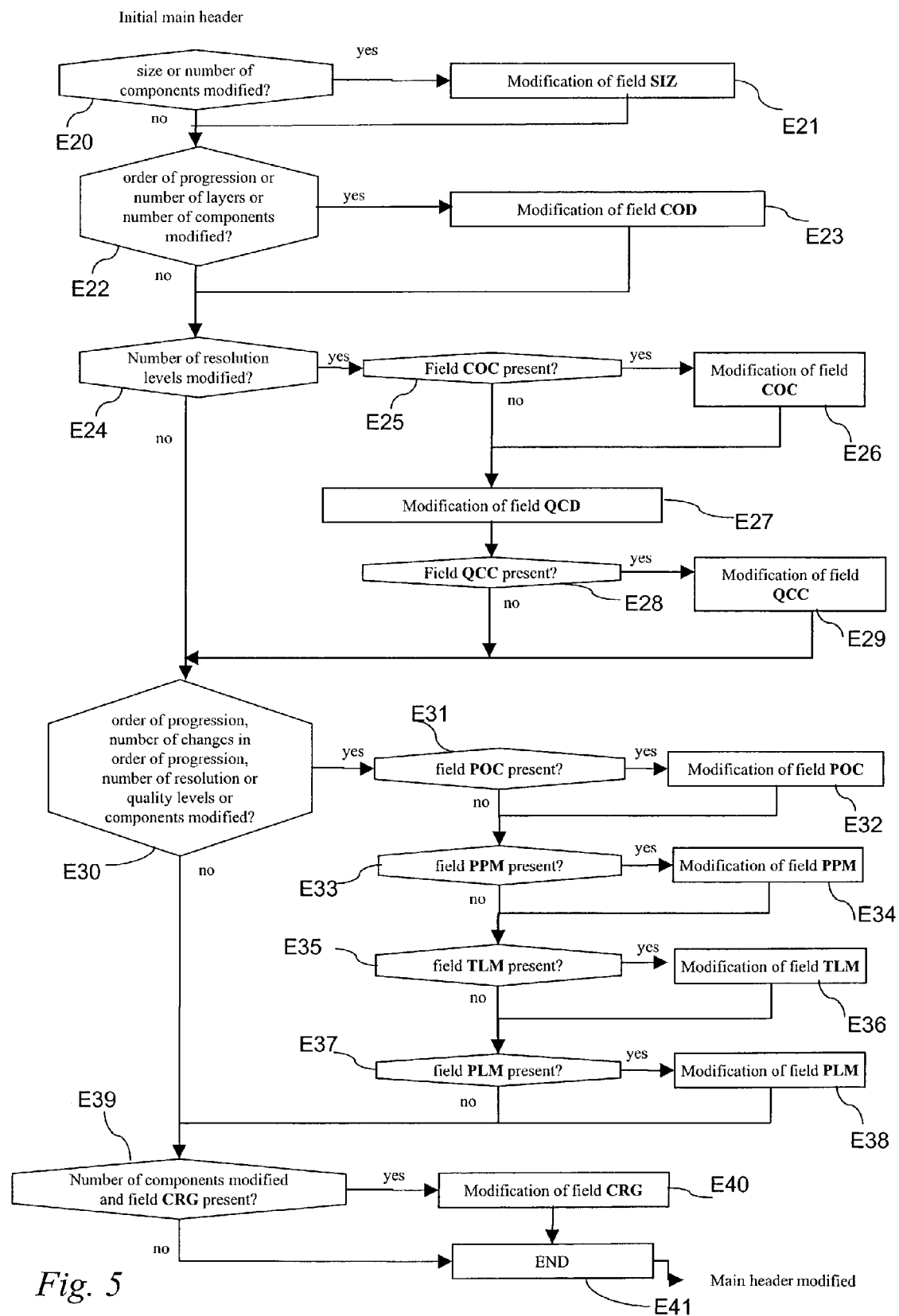
FIGS. 5 and 6 are respectively algorithms for forming the principal header and the tile headers of the compressed signal.

FIG. 5 illustrates an algorithm containing various instructions or portions of software code corresponding to steps of the method according to the invention which detail the content of step E10 of FIG. 3.

The computer program which is based on this algorithm forms part of the program "Progr" based on the algorithm in FIG. 3 and which is stored in the read only memory 104 of FIG. 2.

The algorithm of this FIG. 5 makes provision for modifying the main header of the reduced compressed signal in the process of being formed in order to adapt it to the compressed data contained in this signal.

It should be noted that the fields or "marker segments" RGN and COM of the main header and which were presented above are not modified in the reduced compressed signal.

In general terms, the algorithm in FIG. 5 makes provision for performing a test prior to the modification of a field in order to determine whether the parameters of the final set characterizing the reduced configuration chosen by the user have influenced said field.

In the affirmative, the field is modified accordingly.

It should be noted that each header field contains values coded according to a given code, this code corresponding to a header description syntax defined by JPEG2000 standard.

Thus the modification of a field of the main header consists of entirely recoding the field in question, that is to say giving it one or several new coded values, from the field of the initial compressed signal and the parameters of the final set defining the reduced configuration of the reduced compressed signal.

The coding process used is in accordance with the description syntax as supplied by JPEG2000 part I Final Draft International Standard (corrected and formatted) ISO/IEC JTC1/SC29 WG1 15444 Annex A.

It should be noted that, for the majority of the fields or "marker segments", the recoding of their content in its entirety is simple and inexpensive.

The algorithm in FIG. 5 includes a first step E20 during which a test is performed using the main header of the reduced compressed signal in order to determine whether the size of the decompressed image or the number of components of this signal have been modified.

In the affirmative, step E20 is followed by a step E21 during which the field SIZ is modified by recoding said field.

When the result of the test performed in step E20 is negative or when step E21 is terminated, the following step E22 makes provision for performing a test in order to determine whether the order of progression of the data in the bit stream, the number of quality layers or levels or the number of components have been modified.

In the affirmative, the field COD is modified at step E23 by recoding the field in its entirety.

When the result of the test performed at step E22 is negative or after step E23, the following step E24 makes provision for performing a test in order to determine whether the number of resolution levels has been modified.

In the affirmative, another test is performed at step E25 in order to determine whether the field COC is present in the reduced compressed signal.

The field COC concerns the coding style, the number of decomposition levels, the size of the data blocks, the wavelet transformation applied and the sizes of the spatial positions ("precincts").

In the affirmative, the field COC is modified, as indicated above, by entirely recoding this field at step E26.

When the result of the test performed at step E25 is negative or after step E26, the field QCD corresponding to the quantization type used and to the quantization parameters is modified at step E27 by recoding said field.

Following on from step E27, a step E28 discloses a test in order to determine whether the field QCC corresponding to the quantization type used for a particular component is present in the reduced compressed signal.

In the affirmative, step E28 is followed by a step E29 during which the field QCC is modified by recoding said field.

When the result of the test performed at step E24 is negative or when the test performed at step E28 is negative or after the execution of step E29, a following step E30 makes provision for performing another test during which it is determined whether the order of progression of the data in the bit stream, the number of changes in order of progression, the number of resolution levels, the number of quality levels or the number of components have been modified.

In the affirmative, this step is followed by a step E31 during which a test is performed in order to determine whether the field POC corresponding to the start and end points of a progression is present in the initial compressed signal.

In the affirmative, this step is followed by a step E32 during which the field POC is modified by entirely recoding this field.

When the result of the test performed at step E31 is negative, or after the execution of step E32, a following step E33 makes provision for performing a test in order to determine whether the field PPM corresponding to the packet headers collected together in the main header is present in the reduced compressed signal.

In the affirmative, step E33 is followed by a step E34 during which the field PPM is modified.

A modification mechanism which is more effective than the entire recoding of the field in question is proposed for this field.

It is a case of copying, from the packet headers contained in the initial field PPM, some of these packet headers corresponding to the packets inserted in the body of the reduced compressed signal in the process of formation.

Where the result of the test performed at step E33 is negative or after execution of step E34, a following step E35 makes provision for performing another test on the presence of the field TLM concerning the respective lengths of the tiles and tile segments ("tile parts").

In the affirmative, the field TLM is modified by entirely recoding this field during a step E36.

When the result of the test performed at step E35 is negative or after execution of step E36, a following step E37 makes provision for performing yet another test on the presence of the field PLM concerning the lengths of the packets in the reduced compressed signal.

In the affirmative, this field PLM is modified at step E38 by recoding said field.

Wen the test performed at step E30 is negative or when the test performed at step E37 is negative or after execution of step E38, the algorithm includes a following step E39 during which a test is performed in order to determine whether the number of components has been modified and whether the field CRG corresponding to the configuration of one component with respect to the other components is present in the reduced compressed signal.

In the affirmative, the field CRG is modified at step E40 by recoding said field.

Where the step performed at step E39 is negative or after execution of step E40, a following step E41 terminates the execution of the algorithm in FIG. 5 and the main header, for example denoted 212 in FIG. 4b, which was inserted in the reduced compressed signal, is thus adapted according to the data corresponding to the reduced configuration.

Figure 6:
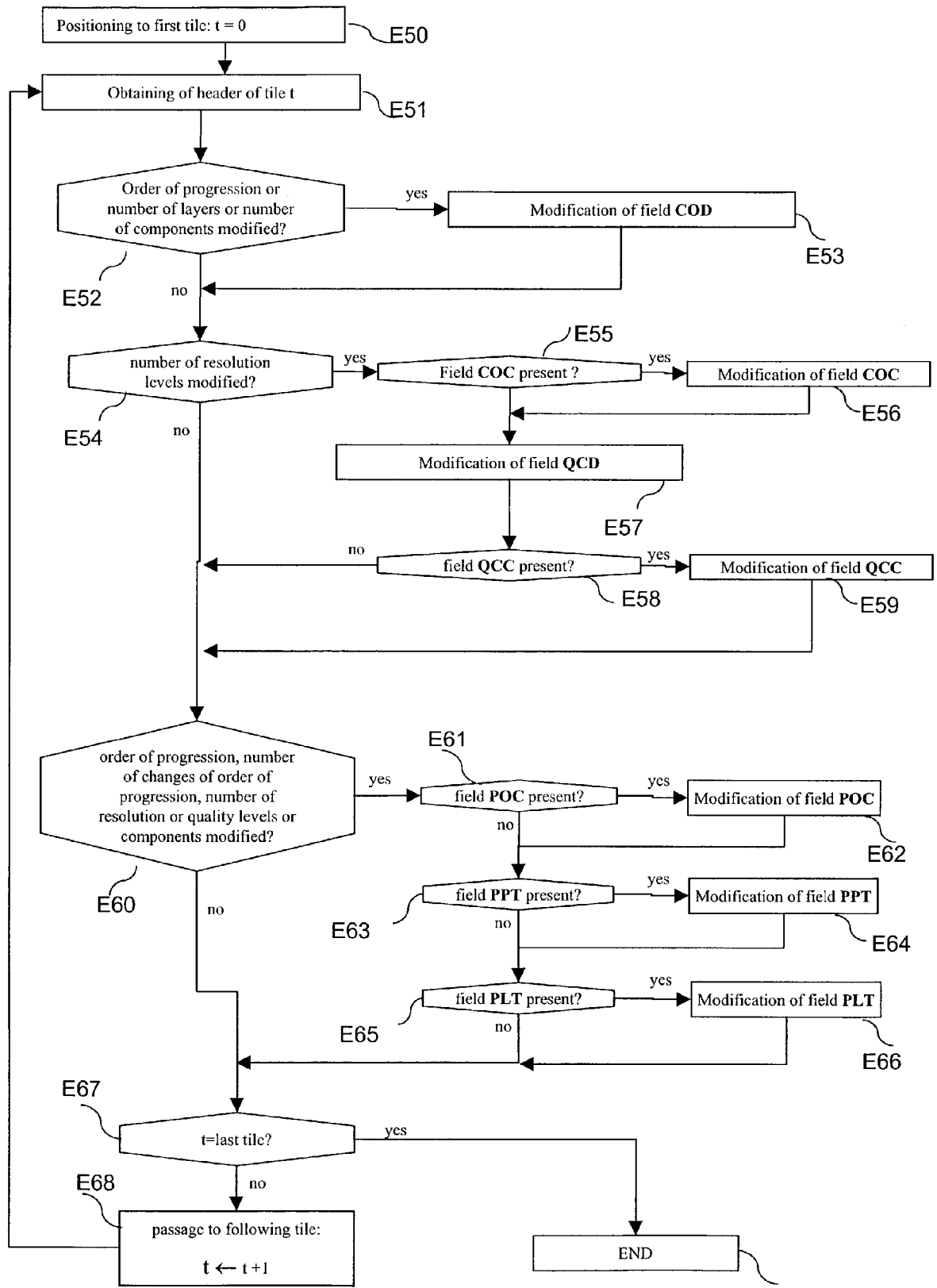

FIG. 6 details the operations of modifying the tile headers evoked at step E10 of the algorithm in FIG. 3.

This FIG. 6 illustrates an algorithm containing various instructions or portions of software code corresponding to steps of the method according to the invention.

The computer program which is based on this algorithm also forms part of the computer program "Progr" on which the algorithm in FIG. 3 is based and which is stored in the read only memory 104 of FIG. 2.

The algorithm in FIG. 6 provides for a tile by tile processing of the reduced compressed image signal in order to make the header of each tile consistent with all the data packets which said tile contains and which correspond to the reduced configuration selected.

The algorithm in FIG. 6 begins with a first step E50 which makes provision for selecting the first tile, for example the tile t0 in FIG. 4a.

The following step E51 makes provision for obtaining the header of the tile to which step E50 relates.

During a following step E52, a test is performed in order to determine whether the order of progression, the number of quality layers or levels or the number of components of the signal has been modified.

In the affirmative, a following step E53 makes provision for modifying the field COD concerning the order of progression, the number of quality levels and the transformation of components used.

This modification is performed by entirely recoding the field in question.

When the result of the test performed at step E52 is negative or after execution of step E53, step E54 makes provision for performing another test in order to determine whether the number of resolution levels has been modified.

In the affirmative, another test is performed at step E55 in order to determine whether the field COC is present in the reduced compressed signal.

In the affirmative, the following step E56 makes provision for modifying the field COC by entirely recoding this field.

When the result of the test performed at step E55 is negative or after execution of step E56, the field QCD is modified by recoding said field at the following step E57.

Step E57 is followed by a step E58 during which a test is performed in order to determine whether the field QCC is present in the signal.

In the affirmative, this step is followed by a step E59 during which this field QCC is modified by recoding said field.

When the result of the test performed at step E54 is negative or when the result of the test performed at step E58 is negative, or after execution of step E59, a test step E60 is then executed.

During this step, it is determined whether the order of progression of the data in the bit stream, the number of changes in order of progression, the number of resolution levels, the number of quality levels or the number of components have been modified.

In the affirmative, this step is followed by a step E61 during which a test is performed on the presence of the field POC in the signal.

In the affirmative, the following step E62 proceeds with a modification of this field by recoding it entirely.

When the result of the test performed at step E61 is negative or after execution of step E62, a following step E63 makes provision for performing a test on the presence of the field PPT in the signal.

It should be noted that the field PPT is the counterpart of the field PPM for the tile headers and indicates that the packet headers of the tile in question are collected together in the header of this tile.

In the affirmative, this field is modified at the following step E64.

It is a case of copying, from the packet headers contained in the initial field PPT, some of the packet headers corresponding to the packets inserted in the relevant tile of the signal in the process of formation.

When the result of the test performed at step E63 is negative or after execution of step E64, the following step E65 performs a test on the presence of the field PLT in the signal.

It should be noted that the field PLT is the counterpart of the field PLM for the tile headers and indicates the respective lengths of the packets contained in the tile in question.

In the affirmative, step E65 is followed by a step E66 during which the field PLT is modified by recoding said field.

When the result of the test performed at step E60 is negative or when the result of the test performed at step E65 is negative or after execution of step E66, the algorithm includes a step E67 during which it is determined whether the tile in question is the last tile in the signal.

In the negative, step E67 is followed by a step E68 during which the index of the tile in question is incremented by one unit in order to process the header of the following tile of the reduced compressed signal.

Step E68 is next followed by the previously described step E51 and the algorithm of FIG. 6 is once again executed.

When the result of the test performed at step E67 is positive, then the following step E69 terminates the execution of this algorithm.

Figure 7:
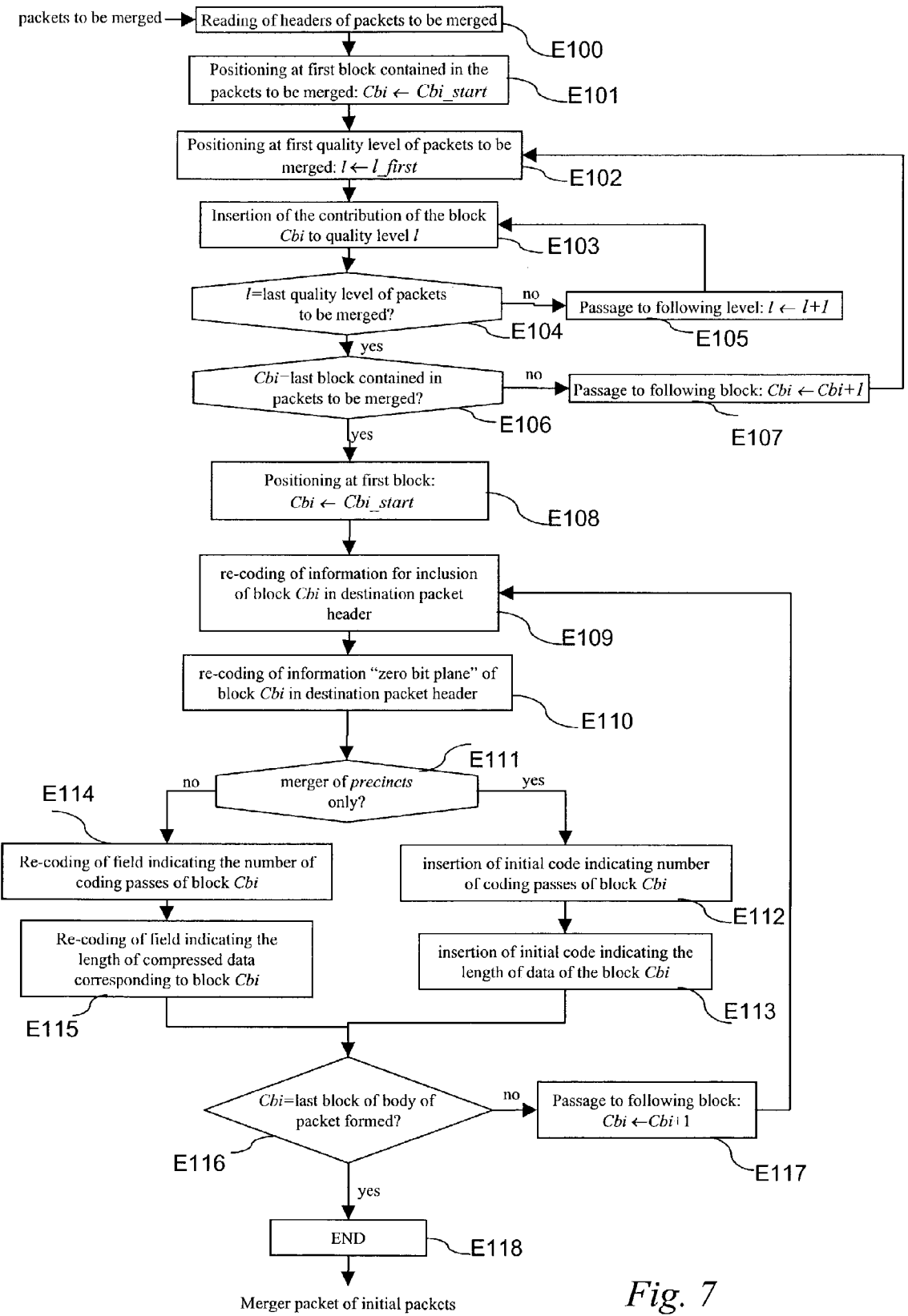
FIG. 7 is an algorithm for simplifying the structure of the reduced compressed signal according to the invention which is attached to the algorithm of FIG. 3.

FIG. 7 depicts the algorithm containing various instructions or portions of software code corresponding to steps of the method according to the invention and which concerns more particularly the simplification of the structure of the reduced compressed signal mentioned at step E13 of the algorithm in FIG. 3.

The computer program based on FIG. 7 forms part of the program "Progr" on which the algorithm in FIG. 3 is based and which is stored in the read only memory 104 in FIG. 2.

The algorithm in FIG. 7 contains a first step E100 of reading the headers of the packets which are to be merged.

Thus, depending on whether it is sought to reduce the number of spatial positions or the number of quality levels, or even the number of spatial positions and the number of quality levels, and this for one and the same resolution level, this step makes provision for reading only the headers of the packets to which the merger relates.

During the reading of the headers of the packets to be merged, the following information, which will be used in the second part of the algorithm, is recovered:

the code block inclusion information field which indicates whether the data block is present in the packet body in question, the zero bit plane information field, which indicates the number of bit planes on which the transformed (wavelet transformation) and quantized coefficients of the data block in question are coded, the position in the bit stream of the initial compressed signal and the length in bytes of the contribution to each quality layer of the data blocks present in the packets to be merged, the field corresponding to the number of coding passes, which indicates the number of coding passes contained in the compressed data block which was inserted in the body of the packet in question.

It should be noted that the algorithm illustrated in this figure must be executed for each resolution level of the reduced compressed signal.

The following step E101 makes provision, with a view to merging the bodies of the packets, for positioning on the first data block contained in the packets to be merged.

First data block means the block which, amongst all the data packets to be merged, is situated in the first spatial position when all the blocks contained and all the packets to be merged are run through, in the spatial order of running through or scanning, termed in English terminology "raster scan". The spatial order of running through corresponds to a line by line scanning, from top to bottom and from left to right.

This step corresponds to a resequencing of the data blocks of the packets which will be merged, the first block of the first packet not necessarily corresponding to the first block and counted in the spatial order of running through.

The first block in question is denoted Cbi_start.

The algorithm includes a following step denoted E102, during which a position is taken, for the data block in question, at the first quality level of the packets merged and which is denoted l_first.

The following step E103 makes provision for inserting the contribution of the data block in question to the quality level l in the body of the packet currently being merged and which will join the packets to be merged.

The following step E104 includes a test according to which it is determined whether the quality level in question is the last level for the packets to be merged.

In the negative, step E104 is followed by a step E105 during which the index of the quality level to be considered for the packets to be merged is incremented by one unit.

Step E105 is then followed by the previously described step E103, during which the contribution of the data block in question to the quality level l+1 is inserted.

When the test performed at step E104 is positive, this step is followed by a step E106 during which a test is performed in order to determine whether the data block in question is the last block contained in the packets to be merged.

In the negative, this step is followed by a step E107 during which the index of the data block in question is incremented by one unit and this step is followed by the previously described step E102.

During this step a position is taken at the first quality level of the packets to be merged for the data block Cbi+1 in question.

Figure 8A:
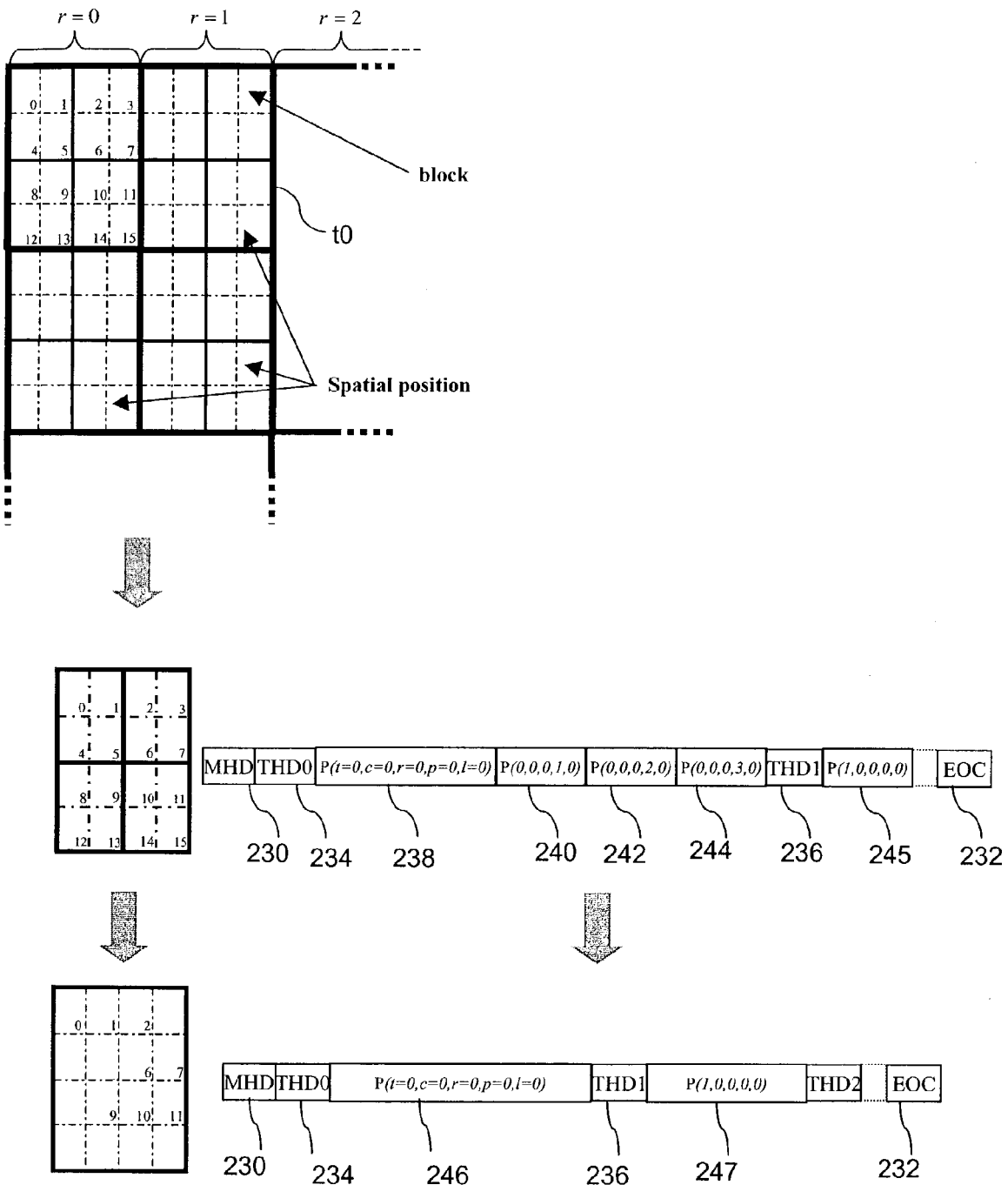
FIG. 8a illustrates the mechanism for merging the packets in the case of reduction of the number of spatial positions.

It will thus be understood that, when the reduced compressed signal includes several spatial positions, as illustrated in FIG. 8a, which will now be described, the data blocks of the various packets to be merged are reordered according to this algorithm, in the body of the packet currently being merged, in the spatial order of running through the blocks.

When the reduced compressed signal includes several quality levels or layers, and then the different data blocks contained in the packets to be merged are inserted in the packet currently being merged in the spatial order of running through and, for each of the blocks in question, the various quality levels or layers of this block are concatenated in increasing order of their index, as will be illustrated later on with reference to FIGS. 9a and 9b.

In addition, when the reduced compressed signal has several quality levels or layers and several spatial positions, then the resequencing of the various blocks contained in the packets to be merged is performed conjointly with the concatenation of the quality levels or layers of the blocks.

Steps E100 to E107 which have just been described perform the merging of the bodies of packets to be merged in a single data packet.

When the test performed at step E106 is positive, then the following step E108 is passed to, which will be described below, after the description of FIGS. 8a and 8b which will now follow.

FIG. 8a illustrates the mechanism used during the merging of several spatial positions ("precincts") contained in the reduced compressed signal.

The top part of FIG. 8a depicts a partial schematic view of a decomposition into frequency sub-bands of the initial image signal compressed according to three resolution levels ($r=0$, $r=1$ and $r=2$).

This figure depicts by means of arrows a spatial position within one and the same resolution level and for the three frequency sub-bands of resolution level $r=1$, for tile t0.

The spatial position thus comprises a set of four compressed data blocks for resolution level $r=0$ and three sets of four blocks for level $r=1$.

To follow the example illustrated in FIGS. 4a and 4b, where the reduced compressed signal I' was formed by the four low sub-bands corresponding to resolution level $r=0$, in FIG. 8a the four spatial positions concerned in the low sub-band of resolution $r=0$ for a given tile will also be dealt with.

It should be noted that, within one and the same sub-band of one and the same resolution level, the data blocks are ordered in the order of spatial which commences at top left and ends at bottom right of the frequency sub-band in question.

The four spatial positions contained in this sub-band contain respectively the data blocks numbered for the first spatial position 0, 1, 4, 5, for the second spatial position 2, 3, 6, 7, for the third spatial position 8, 9, 12, 13, and for the fourth spatial position 10, 11, 14, 15.

As depicted in FIG. 8a, the reduced compressed signal I' in FIG. 4a contains, for each tile, four packets corresponding respectively to the four spatial positions for resolution level r=0.

In FIG. 8a, the reduced compressed signal whose structure is depicted has a header 230 and an end of signal marker 232, as well as several tile headers, of which only the headers referenced 234 and 236 concerning the tiles t0 and t1 are depicted.

For the tile t0, the data packets contained therein are indicated by the references 238, 240, 242 and 244 and correspond respectively to the spatial positions p=0, p=1, p=2 and p=3.

When implementing the mechanism of merging the packet bodies described with reference to steps E101 to E107 of FIG. 7, the four packets 238, 240, 242 and 244 are merged in one and the same packet 246, corresponding to a unique spatial position illustrated by all the data blocks numbered 0 to 15 at bottom left in FIG. 8a.

For tile t1, only one of the data packets contained therein is depicted by the reference 245, for the spatial position p=0.

All the packets of this tile are merged in a single packet noted 247 in the reduced signal.

It should be noted that, in FIG. 8a, the merger of the four packets into a single packet concerns the merger of the bodies of these packets, as well as the merger of their headers, which will be described in the second part of the algorithm in FIG. 7.

Figure 8B:
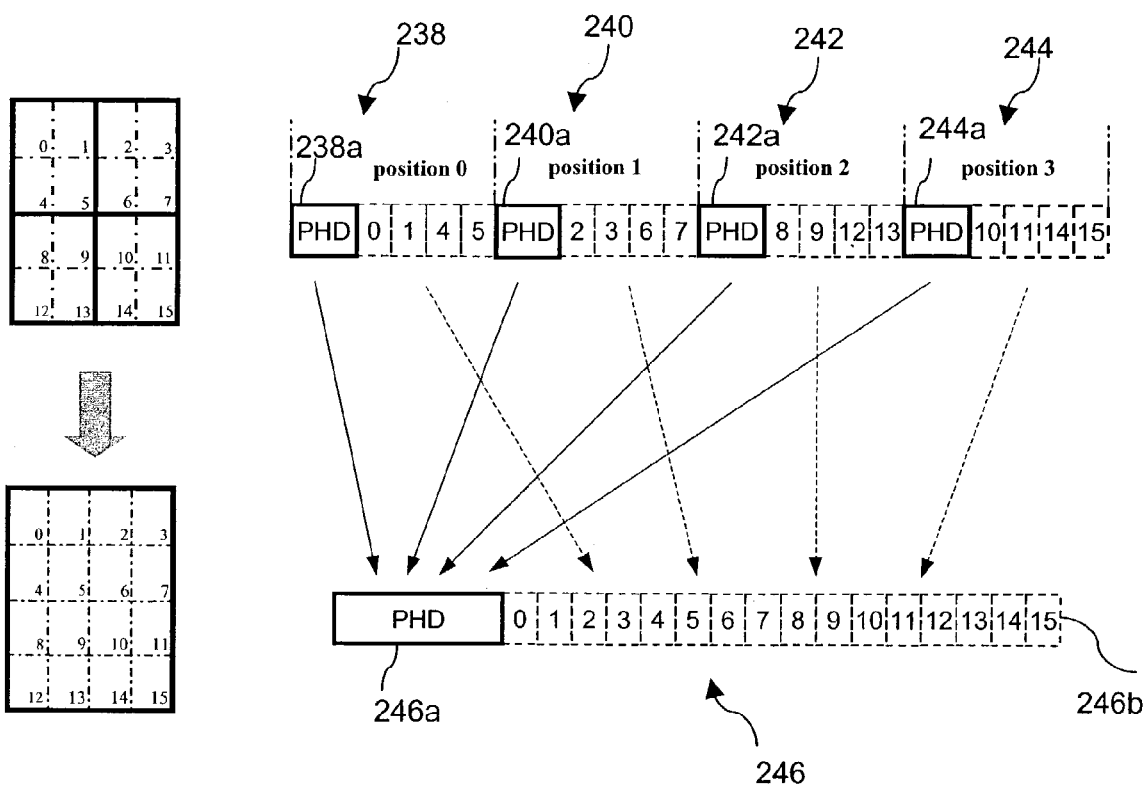

FIG. 8b depicts, in the same positions as those indicated in FIG. 8a, the reduced compressed signal before and after the merging of the packet bodies and the packet headers.

As depicted in FIG. 8b, the different packets 238, 240, 242 and 244 depicted in FIG. 8a are here decomposed into a packet header and packet body consisting of the different data blocks referred to by their index and corresponding to the blocks depicted in the left-hand part of the figure (data blocks of the low sub-band of resolution level r=0).

The data packets in question thus have respectively a header 238a, 240a, 242a and 244a.

As depicted in this figure, the various packets are merged into a single packet 246 having a header 246a and a body 246b.

The body 246b includes the various data blocks contained in the packets to be merged 238, 240, 242 and 244 but which were reordered in the spatial order of running through these blocks within the low-frequency sub-band of resolution level r=0.

Thus the various data blocks are inserted one by one in increasing order of their index in the body 246b.

The various headers 238a, 240a, 242a and 244a are for their part merged into a single header 246a in a merging mechanism which will be described with reference to steps E108 et seq of the algorithm in FIG. 7.

During this step, provision is made for positioning at the first data block denoted Cbi_start identical to the one mentioned at step E101 described previously.

This step is followed by a step E109 during which there is recoded the already coded value of the inclusion information field of the block Cbi in the header of the merged packet.

This field was coded in a known manner within the meaning of JPEG2000 standard by means of a tag tree.

Thus, during step E109, this field is recoded in a known manner, using a tag tree, in order to indicate the presence of the block Cbi in the header of the merged packet.

During the following step E110, the value of the information field "zero bit plane" of the block Cbi in the header of the merged packet is recoded.

The coding of this information field being contextual, that is to say it takes account of what was coded for the previous layers and for the previous data blocks, its recoding is necessary when the headers of the various packets to be merged are merged.

The algorithm in FIG. 7 next includes a step E111 during which a test is performed in order to determine whether or not the merging of the data packets concern solely spatial positions of the signal.

This is because, according to the result of this test, the algorithm provides for a different treatment of the header of the merged packet.

When the test performed at this step E111 is positive, then this step is followed by a step E112 during which the initial coded value indicating the number of coding passes of the data block Cbi is inserted in the merged header.

During the following step E113, the value of the initial code indicating the length of the data block Cbi is inserted in this same header.

On the other hand, when the result of the test performed at step E111 is negative, then a step E114 is provided during which the field indicating the number of coding passes of the data block Cbi in question is recoded.

This is because in this case the contribution of the data block to the merged packet may be greater than before.

During the following step E115, a recoding of the field indicating the length of the compressed data corresponding to the data block Cbi is provided.

The processing performed during steps E114 and E115 concerns the case where the number of quality levels or layers is small, as well as the case where the number of quality levels or layers and the number of spatial positions are small.

The algorithm next includes a step E116 during which a test is performed on the data block Cbi, in order to determine whether it is the last block of the packet body which has just been merged.

In the negative, this step is followed by a step E117 during which the index of the data block Cbi is incremented by one unit, in order to proceed as indicated at the previously described steps E109 to E115 (merging of the packet headers).

When the test performed at step E116 is positive, then the following step E18 ends the algorithm in FIG. 7.

FIGS. 9a and 9b illustrate the mechanism of merging the data packets when the initial compressed signal has several quality layers or levels and it is envisaged reducing their number to one.

As depicted in FIG. 9a, the initial compressed signal has a main header 250, an end of signal marker 252 and headers THD0, THD1, THD2, THD3, corresponding to the tiles t0, t1, t2, t3 and respectively denoted 254, 256, 258 and 260.

The tile t0 includes data packets, of which only those denoted 262, 264 and 266 are depicted and correspond respectively to the quality levels l=0, l=1 and l=2.

In a similar fashion, a data packet 268 has also been shown for the tile t1 and which corresponds to the quality level l=0, as well as two packets 270 and 272 for the tile t3 which correspond respectively to the first and last packets of this tile.

Below this signal there is shown the reduced compressed signal formed by the method according to the invention which was described with reference to FIG. 3.

This signal has a header modified compared with the header 250, denoted 274, and repeats the end of signal marker 252 of the initial compressed signal.

This reduced compressed signal also has tile headers 276, 278, 280 and 282 which have been modified compared with the tile headers of the initial compressed signal 254, 256, 258 and 260.

When the reduced compressed signal was formed, the reduced configuration selected by the user corresponded to the quality levels l=0 and l=1.

Thus the compressed data packets inserted in the reduced compressed signal in the process of being formed are the packets corresponding to these two quality levels, namely, for tile t0, the packets 262 and 264, for tile t1 the packets 268 and 284, for tile t2 the packets 286 and 288 and for tile t3 the packets 270 and 290.

When the packets are merged, in order to reduce the number of quality levels of the reduced compressed signal, the packets 262 and 264, 268 and 284, 286 and 288, 270 and 290 are merged into a single packet respectively denoted 292, 294, 296, 298.

FIG. 9b depicts the mechanism of merging the headers and packet bodies for the compressed data packets 262 and 264 of the reduced compressed signal.

The data packet 262 has a header 262a and a body 262b consisting of different compressed data blocks numbered by their index, in increasing order.

The compressed data packet 264 which is partially depicted has for its part a header 264a and a body 264b, also consisting of data blocks numbered in increasing order of index.

The data blocks of the packet body 262b contribute to the quality layer or level 0, whilst the data blocks of the packet body 264b contribute to the quality layer or level 1.

When the two quality layers or levels 0 and 1 merge, the data blocks are inserted in the body 292b of the packet 292, in increasing order of their spatial index, with the block of index 0 corresponding to the first block encountered in the spatial order of running through the blocks in the signal.

In addition, for each block of given index, the contributions of this block to the various quality layers or levels to be merged are concatenated in the body of the packet 292b, as depicted in FIG. 9b.

Once the body of the packet 292b has been formed, the headers 262a and 264a of the two packets to be merged are in their turn also merged into a single header 292a, as illustrated by FIG. 9b.

The invention claimed is:

1. A method of forming a reduced compressed digital signal according to a hierarchical compression format, the reduced compressed digital signal being formed from an initial compressed digital signal with several hierarchical levels which has been obtained by the compression, according to the hierarchical compression format, of a digital signal comprising data representing physical quantities, the initial signal thus comprising at least one header which comprises information representing a configuration of the signal and the structure of the data therein, the configuration of the signal being defined by an initial set of parameters characterizing all the hierarchical levels of the signal, said method comprising the following steps:

forming, from the at least one header of the initial compressed signal, at least one header of the reduced compressed signal which comprises information representing a reduced configuration of the initial signal and the structure of the data in the compressed signal of reduced configuration, the reduced configuration being defined by a final set of parameters characterizing at least one of the hierarchical levels of the initial compressed signal;

extracting the compressed data corresponding to the final set of parameters from the initial compressed signal; and inserting the extracted data into the reduced compressed signal being formed.

2. A method according to claim 1, further comprising the following steps:

extracting and inserting the at least one header of the initial compressed signal in the reduced compressed signal being formed, and modifying the at least one inserted header according to the compressed data inserted.

3. A method according to claim 2, in which the at least one inserted header comprises several fields, and said method comprises a test step prior to the modification step and during which the field or fields of the at least one header to which at least one of the parameters of the final set of parameters relates are determined.

4. A method according to claim 2, further comprising a step of simplifying the structure of the reduced compressed signal and, when the at least one header of the initial compressed signal is extracted and inserted into the reduced compressed signal, the step of modifying the at least one header occurs after said simplification step.

5. A method according to claim 1, further comprising the following steps:

obtaining information representing the reduced configuration of the initial signal and the structure of the data corresponding to the reduced configuration; and inserting the obtained information in the reduced compressed signal being formed in order to form the at least one header of the signal.

6. A method according to claim 5, further comprising a step of simplifying the structure of the reduced compressed signal and, when information representing the reduced configuration of the initial signal and the structure of the data corresponding to the reduced configuration are obtained and inserted into the reduced compressed signal, said steps of obtaining and inserting take place after said simplification step.

7. A method according to claim 1, in which, when the digital signal is an image signal, the final set of parameters characterizing at least one of the hierarchical levels of the initial compressed signal comprises at least one parameter amongst the parameters consisting of a resolution level, a quality level and a component of the signal.

8. A method according to claim 1, further comprising a step of simplifying the structure of the reduced compressed signal.

9. A method according to claim 8, further comprising a prior test step according to at least one predetermined criterion in order to determine whether or not a simplification of the structure of the reduced compressed signal will take place.

10. A method according to claim 1, in which the compressed data of the reduced compressed image signal is organized in data packets P which, in their turn, are organized in ordered data blocks, each packet comprising a packet header and a packet body containing data blocks, a packet P corresponding to a resolution level, to a quality level, to a component of the signal and, when the initial signal has been decomposed into frequency sub-bands, to a set of data blocks of the decomposed signal, referred to as the spatial position, and having a given spatial location in the sub-band or sub-bands constituting one and the same resolution level.

11. A method according to claim 10, further comprising a step of simplifying the structure of the reduced compressed signal which comprises, more particularly, the following steps for each resolution level of the reduced compressed signal:

merging, into a single data packet header, the headers of various packets to which the simplification relates; and merging, into a single packet body, the bodies of the various packets concerned, said merging of the bodies including a resequencing of the data blocks contained in the bodies.

12. A method according to claim 11, in which the resequencing depends on the simplification of the structure of the signal.

13. A method according to claim 11, in which, when the reduced compressed signal has several spatial positions for the same resolution level, the merged packets are those allocated to these different spatial positions.

14. A method according to claim 13, in which the data blocks are resequenced in the body of the single packet, for the resolution level in question, in the spatial order of running through the blocks which is in accordance with the description syntax of the signal.

15. A method according to claim 11, in which, when the reduced compressed signal has several quality levels for the same resolution level, the merged packets are those which contribute to these different quality levels.

16. A method according to claim 15, in which the data blocks are resequenced in the body of the single packet, for the resolution level in question, by concatenating the contributions of one and the same data blocks to the various quality levels, in increasing order of these levels.

17. A method according to claim 11, in which, when the reduced compressed signal has, for one and the same resolution level, several quality levels and several spatial positions, the data blocks are resequenced in the body of the single packet in the order of spatial travel of these blocks which is in accordance with the description syntax of the signal and, for each block, by concatenating the contributions of this block to the various quality levels.

18. A method according to claim 11, further comprising a different processing step for the header of the single packet depending on whether or not the merger of the data packets is solely related to spatial positions of the signal.

19. A device for forming a reduced compressed digital signal according to a hierarchical compression format, the reduced compressed digital signal being formed from an initial compressed digital signal with several hierarchical levels which has been obtained by the compression, according to the hierarchical compression format, of a digital signal comprising data representing physical quantities, the initial signal thus comprising at least one header which comprises information representing the configuration of the signal and the structure of the data therein, the configuration of the signal being defined by an initial set of parameters characterizing all the hierarchical levels of the signal, said device comprising:

means for forming at least one header of the reduced compressed signal from the at least one header of the initial compressed signal, the at least one header of the reduced compressed signal comprising information representing a reduced configuration of the initial signal and the structure of the data in the compressed signal of reduced configuration, the reduced configuration being defined by a final set of parameters characterizing at least one of the hierarchical levels of the initial compressed signal;

means for extracting the compressed data corresponding to the final set of parameters from the initial compressed signal; and means for inserting the extracted data into the reduced compressed signal being formed.

20. A device according to claim 19, further comprising:

means for extracting and inserting the at least one header of the initial compressed signal into the reduced compressed signal being formed; and means for modifying the at least one inserted header according to the compressed data inserted.

21. A device according to claim 20, wherein the at least one inserted header comprising several fields, and said device further comprises test means for determining the field or fields of the at least one header to which at least one of the parameters of the final set of parameters relates.

22. A device according to claim 19, further comprising:

means for obtaining information representing the reduced configuration of the initial signal and the structure of the data corresponding to the reduced configuration; and means for inserting the obtained information into the reduced compressed signal being formed in order to form the at least one header of the signal.

23. A device according to claim 19, wherein, when the digital signal is an image signal, the final set of parameters characterizing at least one of the hierarchical levels of the initial compressed signal comprises at least one parameter amongst the parameters consisting of a resolution level, a quality level and a component of the signal.

24. A device according to claim 19, further comprising means for simplifying the structure of the reduced compressed signal.

25. A device according to claim 24, further comprising means for testing, according to at least one predetermined criterion, in order to determine whether or not a simplification of the structure of the reduced compressed signal will take place.

26. A device according to claim 19, wherein the compressed data of the reduced compressed image signal is organized into data packets P which, in turn, are organized into ordered data blocks, each packet comprising a packet header and a packet body containing data blocks, a packet P corresponding to a resolution level, to a quality level, to a component of the signal and, when the initial signal has been decomposed into frequency sub-bands, to a set of data blocks of the decomposed signal, referred to as the spatial position, and having a given spatial location in the sub-band or sub-bands comprising one and the same resolution level.

27. A device according to claim 26, further comprising means for simplifying the structure of the reduced compressed signal which comprise more particularly:

means for merging, into a single data packet header, the headers of various packets to which the simplification relates, and means for merging, into a single packet body, the bodies of the various packets concerned, said means for merging the bodies including means for resequencing the data blocks.

28. A device according to claim 27, wherein the resequencing means apply a resequencing of the blocks which depends on the simplification of the structure of the signal.

29. A device according to claim 27, wherein, when the reduced compressed signal has several spatial positions for one and the same resolution level, the merged packets are those allocated to these different spatial positions.

30. A device according to claim 29, wherein said resequencing means reorder the data blocks in the body of the single packet, for the resolution level in question, in the spatial order of running through the blocks which is in accordance with a description syntax of the signal.

31. A device according to claim 27, wherein, when the reduced compressed signal has several quality levels for one and the same resolution level, the merged packets are those which contribute to these various quality levels.

32. A device according to claim 31, wherein the resequencing means reorder the data blocks in the body of the single packet, for the resolution level in question, by concatenating the contributions of one and the same data block to the various quality levels, in increasing order of these levels.

33. A device according to claim 27, wherein, when the reduced compressed signal has, for one and the same resolution level, several quality levels and several spatial positions, said resequencing means reorder the data blocks in the body of the single packet in the order of spatial travel of these blocks which is in accordance with a description syntax of the signal and, for each block, by concatenating the contributions of the block to the various quality levels.

34. A device according to claim 27, further comprising means for processing the header of the single packet which are different depending on whether or not the merger of the data packets concerns solely spatial positions of the signal.

35. Data processing apparatus, comprising a device for forming a reduced compressed digital signal according to claim 19.

36. Information storage means which can be read by a computer or a microprocessor comprising code instructions of a computer program for executing the steps of the method of forming a reduced compressed digital signal according to claim 1.

37. Partially or totally removable information storage means which can be read by a computer or a microprocessor, comprising code instructions of a computer program for executing the steps of the method of forming a reduced compressed digital signal according to claim 1.

38. Computer program which can be loaded in a programmable apparatus, comprising sequences of instructions or portions of software code for implementing the steps of the method of forming a reduced compressed digital signal according to claim 1, when the computer program is loaded and executed by the programmable apparatus.

* * * * *

UNITED STATES PATENT AND TRADEMARK OFFICE
CERTIFICATE OF CORRECTION

PATENT NO. : 7,281,033 B2
APPLICATION NO. : 10/352971
DATED : October 9, 2007
INVENTOR(S) : Fabrice Le Leannec et al.

It is certified that error appears in the above-identified patent and that said Letters Patent is hereby corrected as shown below:

COLUMN 16

Line 32, "thumb nail" should read --thumbnail--.

COLUMN 19

Line 22, "Wen" should read --When--.

COLUMN 24

Line 56, "step El8" should read --step E118--.

COLUMN 28

Line 23, "comprising" should read --comprises--; and
Line 63, "comprise" should read --comprises--.

Signed and Sealed this

Twelfth Day of May, 2009

JOHN DOLL
*Acting Director of the United States Patent and Trademark Office*